United States Patent
Gossett et al.

(10) Patent No.: US 6,230,177 B1
(45) Date of Patent: May 8, 2001

(54) METHOD AND APPARATUS FOR PERFORMING FAST FOURIER TRANSFORMS

(75) Inventors: Carroll Philip Gossett; Nancy Cam Winget, both of Mountain View; Chien-Ping Lu, Milpitas, all of CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/096,538

(22) Filed: Jun. 12, 1998

(51) Int. Cl.$^7$ ........................................... G06F 17/14
(52) U.S. Cl. .............................. 708/404; 708/290
(58) Field of Search .......................... 708/403–409, 708/290

(56) References Cited

U.S. PATENT DOCUMENTS

| | | | |
|---|---|---|---|
| 5,303,172 | * 4/1994 | Magar et al. | 708/406 |
| 5,355,443 | 10/1994 | Kim et al. | 395/131 |
| 5,467,459 | 11/1995 | Alexander et al. | 395/480 |
| 5,471,592 | 11/1995 | Gove et al. | 395/300.03 |
| 5,684,981 | * 11/1997 | Jones | 708/290 |
| 5,706,416 | 1/1998 | Mann et al. | 395/127 |
| 5,710,876 | 1/1998 | Peercy et al. | 395/126 |
| 5,724,599 | 3/1998 | Balmer et al. | 395/800 |
| 5,740,344 | * 4/1998 | Lin et al. | 708/290 |
| 5,742,353 | 4/1998 | Yasuki et al. | 348/578 |
| 5,757,374 | 5/1998 | Nakamura et al. | 345/425 |
| 5,790,134 | 8/1998 | Lentz | 345/501 |
| 5,801,678 | * 9/1998 | Huang et al. | 708/290 |
| 5,808,617 | 9/1998 | Kenworthy et al. | 345/421 |
| 5,870,097 | 2/1999 | Snyder et al. | 345/426 |
| 5,949,424 | 9/1999 | Cabral et al. | 345/426 |
| 6,002,410 | 12/1999 | Battle | 345/513 |
| 6,005,582 | 12/1999 | Gabriel et al. | 345/430 |
| 6,021,423 | * 2/2000 | Nag et al. | 708/403 |
| 6,111,584 | 8/2000 | Murphy | 345/430 |

OTHER PUBLICATIONS

Akeley, K., "Reality Engine Graphics," Proceedings of the 20$^{th}$ Annual Conference on Computer Graphics, 1993, pp. 109–116.

Barkans, A., "High Quality Rendering Using the Talisman Architecture," Proceedings of the 1997 SIGGRAPH/Eurographics Workshop on Graphics Hardware, 1997, pp. 79–88.

Bastos, R. et al., "Efficient Radiosity Rendering Using Textures and Bicubic Reconstruction," Proceedings of the 1997 Symposium on Interactive 3D Graphics, 1997, pp. 71–74.

Peercy, M. et al., "Efficient Bump Mapping Hardware," Proceedings of the 24$^{th}$ Annual Conference on Computer Graphics and Interactive Techniques, 1997, pp. 303–306.

* cited by examiner

Primary Examiner—David H. Malzahn
(74) Attorney, Agent, or Firm—Sterne, Kessler, Goldstein & Fox P.L.L.C.

(57) ABSTRACT

The method and apparatus employ a texture filter in a graphics processor to perform a transform such as, for example, a Fast Fourier Transform. The texturizer can include an array of linear interpolators. The architecture reduces the computational complexity of the transform processes.

20 Claims, 12 Drawing Sheets

⇒ PASS FOR REAL PORTION
--▶ PASS FOR IMAGINARY PORTION

FIG. 14

| →s | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ↓t | 16 | 17 | 18 | 19 | 20 | 21 | 22 | 23 | 24 | 25 | 26 | 27 | 28 | 29 | 30 | 31 |
|  | 32 | 33 | 34 | 35 | 36 | 37 | 38 | 39 | 40 | 41 | 42 | 43 | 44 | 45 | 46 | 47 |
|  | 48 | 49 | 50 | 51 | 52 | 53 | 54 | 55 | 56 | 57 | 58 | 59 | 60 | 61 | 62 | 63 |

FIG. 15

| →s | 0 | 32 | 1 | 33 | 2 | 34 | 3 | 35 |
|---|---|---|---|---|---|---|---|---|
| ↓t | 16 | 48 | 17 | 49 | 18 | 50 | 19 | 51 |
|  | 4 | 36 | 5 | 37 | 6 | 38 | 7 | 39 |
|  | 20 | 52 | 21 | 53 | 22 | 54 | 23 | 55 |
|  | 8 | 40 | 9 | 41 | 10 | 42 | 11 | 43 |
|  | 24 | 56 | 25 | 57 | 26 | 58 | 27 | 59 |
|  | 12 | 44 | 13 | 45 | 14 | 46 | 15 | 47 |
|  | 28 | 60 | 29 | 61 | 30 | 62 | 31 | 63 |

FIG. 16

| →s | 0 | 16 | 32 | 48 | 1 | 17 | 33 | 49 | 2 | 18 | 34 | 50 | 3 | 19 | 35 | 51 |
|---|---|---|---|---|---|---|---|---|---|---|---|---|---|---|---|---|
| ↓t | 4 | 20 | 36 | 52 | 5 | 21 | 37 | 53 | 6 | 22 | 38 | 54 | 7 | 23 | 39 | 55 |
|  | 8 | 24 | 40 | 56 | 9 | 25 | 41 | 57 | 10 | 26 | 42 | 58 | 11 | 27 | 43 | 59 |
|  | 12 | 28 | 44 | 60 | 13 | 29 | 45 | 61 | 14 | 30 | 46 | 62 | 15 | 31 | 47 | 63 |

METHOD AND APPARATUS FOR PERFORMING FAST FOURIER TRANSFORMS

BACKGROUND

The present invention is directed to a method and apparatus for performing fast fourier transforms. More particularly the invention is directed to performing fast fourier transforms in a texturizing subsystem in a graphics processing device.

Computer generated graphics are being used today to perform a wide variety of tasks. Many different areas of business, industry, government, education, and entertainment are tapping into the enormous and rapidly growing list of applications developed for today's increasingly powerful computer devices.

Graphics have also been used for communicating ideas, data, and trends in most areas of commerce, science, and education. Until recently, real time user interaction with three dimensional (3D) model and pseudo-realistic images was feasible on only very high performance workstations. These workstations contain dedicated, special purpose graphics hardware. The progress of semiconductor fabrication technology has made it possible to do real time 3D animation with color shaded images of complex objects, described by thousands of polygons, on powerful dedicated rendering subsystems moving away from the need for a dedicated workstation. The most recent and most powerful workstations are capable of rendering completely life-like, realistically lighted 3D objects and structures. But other graphics processing devices are capable of object rendering which was previously only alterable using high performance work stations.

In addition to the generation of graphics, there has been a continuing development in image processing. Examples of imaging applications include electronic light tables (ELTs) which can be used for defense imaging, two dimensional (2D) and 3D visualization techniques for medical imaging or in other markets where image processing can be critical, e.g., pre-press and post-production to name a few.

In the past, it has been thought that dividing the image processing functionality and the graphics processing functionality into separate dedicated hardware was an advantageous architecture.

Co-pending application entitled A METHOD AND APPARATUS FOR PROVIDING IMAGE AND GRAPHICS PROCESSING USING A GRAPHICS RENDERING ENGINE, U.S. Ser. No. 956,537, filed on Oct. 23, 1997 describes a technique by which the graphics processing and image processing are performed with the same hardware. The description of the graphics rendering engine, including the image processing operations performed thereby, is incorporated herein by reference.

Fast Fourier Transform (FFT) is a key imaging operation in many imaging application domains, for example, medical imaging and image compression, in particular. Due to the special computational requirements of FFT, real-time FFT engines are traditionally implemented as black-box hardwares for special purposes. General purpose FFT sometimes needs the computational power of a supercomputer like a Cray-2.

A review of the mathematical background regarding FFTs will be illuminative of the complexities involved in implementing such an imaging operation.

Basic Formulations

The one dimensional Fourier transform of a continuous function f(x) is $$F(u) = \int_{-\infty}^{\infty} f(x) e^{-2\pi j u x} dx \quad (1)$$

Intuitively speaking, the Fourier Transform decomposes a function into a set of sinusoidal basis functions at different frequencies. For each frequency u, F(u), a complex number (i.e., a number having real and imaginary components), tells you the magnitude and the phase of the associated sinusoidal function. Therefore, f(x) can be written as a summation of sinusoidal functions as follows $$f(x) = \int_{-\infty}^{\infty} F(u) e^{2\pi j u x} du \quad (2)$$

In fact, we can reverse the role of f(x) and F(u), and call f(x) the Inverse Fourier Transform (IFT) of F(u).

The discrete version of the Fourier Transform of an array f(n) of size N is $$F(k) = \sum_{n=0}^{N-1} f(n) e^{-2\pi j n k / N}, k = 0, \ldots, N-1 \quad (3)$$

and the Inverse Discrete Fourier Transform (IDFT) of F(k) is $$f(n) = \frac{1}{N} \sum_{k=0}^{N-1} F(k) e^{2\pi j n k / N} \quad (4)$$

The complex phase factor $e^{-2\pi j / N}$ can be abbreviated as $W_N$. We can rewrite Equation 4 as $$F(k) = \sum_{n=0}^{N-1} f(n) W_N^{nk} \quad k = 0, \ldots, N-1 \quad (5)$$

Computing F(k) directly from the formula above requires:
  $2N^2$ evaluations of trigonometric functions; and
  N(N−1) complex additions.

The order of the complexity of the direct computations of DFT is $N^2$, which is typically prohibitive for real-time applications.

It is known that the phase factor $W_N$ has the following properties:
  Symmetry property: $W_N^{k+N/2} = -W_N^k$
  Periodicity property: $W_N^{k+N} = W_N^k$
  Multiplicity property: $W_N^{Lk} = W_{N/L}^k$ These properties can be exploited to adopt a divide-and-conquer approach to calculate these Discrete Fourier transform (DFT). The computationally efficient algorithms that exploit these properties are known as Fast Fourier Transforms (FFTs) described as follows.

Suppose that N, the size of the f(n) array, can be factorized as a product of two integers N=L×M, then f(n) and F(k) can be arranged in two dimensional (2-D) arrays f(l, m) and F(q,p) as shown in FIG. 1 using the mapping $$n = Ml + m, \text{ and } k = Lq + p \quad (6)$$

where $0 \leq l \leq L-1$  $0 \leq m \leq M-1$ $0 \leq p \leq L-1$  $0 \leq q \leq M-1$ The top half of the FIG. 1 shows the M (columns)×L (rows) array of f(n) with an array size N=M×L. The bottom half of the figure shows the M×L array for the DFT F(k). The DFT of f(n) can be reformulated as:

$$F(q, p) = \sum_{m=0}^{M-1} \sum_{l=0}^{L-1} f(m, l) W_N^{(Ml+m)(Lq+p)} \quad (7)$$

But, $$W_N^{(Ml+m)(Lq+p)} = W_N^{MLql} W_N^{Mpl} W_N^{mqL} W_N^{mp}$$

According to properties of the phase factor $W_N$, as described above, $W_N^{MLql} = W_N^{Nql} = 1$, $W_N^{Mpl} \ W_{N/M}^{pl} = W_L^{pl}$ $W_N^{(mqL)} = W_{N/L}^{mq} = W_M^{mq}$ Using these simplifications, $$F(q, p) = \left( \sum_{m=0}^{M-1} W_M^{qm} \sum_{l=0}^{L-1} f(m, l) W_L^{pl} \right) W_N^{mp} \quad (8)$$

For Example: N=12 N=4×3=12 select L=4, m=3
We would store f(n) as:

|  | m = 0<br>col. 0 | m = 1<br>col. 1 | m = 2<br>col. 2 |
|---|---|---|---|
| L = 0 row 0 | f(0,0) = f(0) | f(1,0) = f(1) | f(2,0) = f(2) |
| L = 1 row 1 | f(0,1) = f(3) | f(1,1) = f(4) | f(2,1) = f(5) |
| L = 2 row 2 | f(0,2) = f(6) | f(1,2) = f(7) | f(2,2) = f(8) |
| L = 3 row 3 | f(0,3) = f(9) | f(1,3) = f(10) | f(2,3) = f(11) |

Using equation 8: $F(q, p) = \sum_{m=0}^{M-1} \sum_{l=0}^{L-1} f(m, l) W_L^{pl} W_N^{mp} W_M^{qm}$ The computation of the DFT for f(n) can be divided into the following four steps: STEP 1. Compute the L-point DFT of each column m, for all m=0, . . . m−1 that is, we compute $$F(m, p) = \sum_{l=0}^{L-1} f(m, l) W_L^{pl} \text{ for } m = 0, \ldots, M-1 \quad (9)$$

where, each point F(m, p) can be considered as a partially transformed function which is indexed by p, a frequency domain coordinate, and m, the same spatial domain coordinate F(m, p) storage can be represented as:

| F (0,0) | F (1,0) | F (2,0) |
| F (0,1) | F (1,1) | F (2,1) |
| F (0,2) | F (1,2) | F (2,2) |
| F (0,3) | F (1,3) | F (2,3) |

Step 2: Multiply each F (m, p) by $W_N^{mp}$ where $W_N^{mp}$ is referred to as the phase or twiddling factor so that:

$$G (m, p) = F (m,p) \ W_N^{mp} \quad (10)$$

G(m, p) storage can be represented as:

|  | m = 0 | m = 1 | m = 2 |
|---|---|---|---|
| p = 0 | G (0,0) | G (1,0) | G (2,0) |
| p = 1 | G (0,1) | G (1,1) | G (2,1) |
| p = 2 | G (0,2) | G (1,2) | G (2,2) |
| p = 3 | G (0,3) | G (1,3) | G (2,3) |

Step 3: Compute the M-point DFTs of each row p, where p=0, . . . L−1

$$F(q, p) = \sum_{m=0}^{M-1} G(m, p) W_M^{qm} \text{ for } p = 0, \ldots, L-1 \quad (11)$$

The storage representation for the final DFT results in:

| 1 = 0 | F (0,0) = F (0) | F (1,0) = F (4) | F (2,0) = F (8) |
| 1 = 1 | F (0,1) = F (1) | F (1,1) = F (5) | F (2,1) = F (9) |
| 1 = 2 | F (0,2) = F (2) | F (1,2) = F (6) | F (2,2) = F (10) |
| 1 = 3 | F (0,3) = F (3) | F (1,3) = F (7) | F (2,3) = F (11) |

STEP 4: Output F(k) by reading the resulting F(q, p) columnwise. The computational complexity for performing these FFT's involves N(M+L+1) Complex multiplications; and N(M+L−2) Complex addition Thus, the computational requirements for this technique are smaller than those for computing DFTs directly.

A block diagram representation of a top-level view of this four step process is shown in FIG. 4. The data, that is the f(n) army of size N is arranged into an L×M matrix and is provided to the L-Point FFT, module 401, which performs step 1. The output of module 401 is provided to multiplier 402 by which the twiddling factor is applied as in step 2. The resulting product is presented to the M-point FFT module, 403 at which step 3 is performed. Finally, the transposer 404 reads out the result of the module 403 in a manner to provide output F(k) as in step 4.

Even more reduction of computations can be achieved by recursively factorizing L or M, or both, just as the N matrix was decomposed.

The first factor L can be selected to be small enough that the L-point FFT can be computed directly. When N is a power of some small number r, we can repeat the decomposition recursively until the computation involves only r-point FFTs. The algorithms are then called radix-r FFT, which can be constructed from r-point FFT building blocks. Radix-2 FFT is by far the most widely used FFT algorithms.

FIG. 4 provides a block diagram of a high level view of a system that performs the four step processing using a 4 point FFT as the L-point FFT module. Again, presume the matrix in question is of size N. When the number of data points N is a power of 4; that is $N=4^v$ we can further reduce the computational requirements by employing a radix −4 DFT algorithm. In this case M=4 and L=N/4 m,q=0, 1,2,3 and l,p=0, 1, . . . ,N/4−1 n=4l+m $$k = \frac{N}{4}q + p$$

So, the storage arrangement becomes $$f(n)=f(m,l)=f(4l+m)$$

$$F(q, p) = F\left(\frac{N}{4}q + p\right)$$

where $F(q, p) = \sum_{m=0}^{3} W_N^{mp} F(m, p) W_4^{mq}$ for $q = 0, 1, 2, 3$ (12)

and $$F(m, p) = \sum_{l=0}^{\frac{N}{4}-1} f(m, l) W_{\frac{N}{4}}^{pl}$$

for $m = 0, 1, 2, 3$ and $p = 0, 1, \ldots, \frac{N}{4} - 1$

Further, we define a "butterfly" to be that computation where, given two complex numbers say a and b, multiply b by $W_N^r$ and then add and subtract the product from a to form two new complex numbers A and B.

As shown in FIG. 2, a butterfly involves one complex multiplication and two complex additions. Using EQN 12 and the butterfly notation, the expression for combining the $$\frac{N}{4}$$

point DFT's defines a radix-4 butterfly that can be expressed in matrix form as:

$$\begin{bmatrix} F(q, 0) \\ F(q, 1) \\ F(q, 2) \\ F(q, 3) \end{bmatrix} = \begin{bmatrix} 1 & 1 & 1 & 1 \\ 1 & -j & -1 & j \\ 1 & -1 & 1 & -1 \\ 1 & -j & -1 & -j \end{bmatrix} \begin{bmatrix} W_N^0 & F(q, 0) \\ W_N^q & F(q, 1) \\ W_N^{2q} & F(q, 2) \\ W_N^{3q} & F(q, 3) \end{bmatrix}$$

or in butterfly notation as shown in FIG. 3.

Since $W_N^0=1$, each butterfly involves 3 complex multiplications and 12 additions.

This process can be repeated recursively V times. Hence, the radix-4 algorithm consists of V stages, where each stage contains $$\frac{N}{4}$$

butterflies. Consequently, the computational complexity of this algorithm is reduced to $$\frac{3N}{8}$$

$\log_2 N$ complex multiplications and $$\frac{3N}{2}$$

$\log_2 N$ complex additions.

FIG. 5 illustrates a block diagram, similar to that of FIG. 4 but reflecting the use of a 4-point FFT module 501. Also, the M-point FFT 403 is replaced by the N/4-point FFT module 503.

An array of size N can be arranged in a hypercube with $\log_4 N$ dimensions, and treat the N-point FFT as $\log_4 N$ passes of 4-point FFTs along each of the dimensions of the hypbercube. FIG. 6 illustrates an example of such a hypercube for a 64-point FFT.

For a 64-point FFT, N=64, the computation can be considered as 3 passes of 16 (N/4, N=64) 4-point FFTs along each of the dimensions on a 4×4×4 cube. The inputs are stored in x-y-z order, and the outputs are read in z-y-x order. The order of the dimensions in which the output are retrieved is reversed from that in which the data are stored. For general N-point FFT using radix-4 algorithm, the hypercube metaphor can be explained mathematically as follows. Let $p=\log_4 N$, then the index n to the array f(n) can be represented in binary form as:

$$n = b_{p-1} b_{p-2} \ldots b_1 b_0 \tag{13}$$

where $b_i=0$ or 1 for $i=0, \ldots, p-1$

By grouping every two bits, we have $$n = d_{q-1} d_{q-2} \ldots d_1 d_0 \tag{14}$$

where $d_i = b_{2i+1} b_{2i}$, and $q=p/2$.

For example, for $n=b_7, b_6, \ldots, b_1, b_0$ then $d_3=(b_7, b_6)$, $d_2=(b_5, b_4)$ etc.

From here, one-dimensional f(n) can be represented as q-dimensional $$f(d_0, d_1, \ldots d_{q-2}, d_{q-1}) \tag{15}$$

The index k of the output F(k) corresponding to f(n) is related to n by $$k = d_0 d_1 \ldots d_{q-2} d_{q-1} \tag{16}$$

We call the reversal of the pairs of bits as nibble reversal.

Comparing the complexity of the various DFT algorithms discussed it is seen that:

TABLE 1

Comparing the orders of complexity of different DFT algorithms.

| Order of Complexity | Direct Computation | L × M Decomp. | Radix-r |
|---|---|---|---|
| Complex Multiplication | $N^2$ | $N (M + L)$ | $N(r\log_r N)$ |
| Complex Addition | $N^2$ | $N (M + L)$ | $N(r\log_r N)$ |

For example, N = 64, M = 8, L = 8, r = 4

TABLE 2

| Order of Complexity | Direct Computation | L × M Decomp. | Radix-r |
|---|---|---|---|
| Complex Multiplication | $64^2 = 4096$ | $64 \times 16 = 1024$ | $64(4\log_4 64) = 768$ |
| Complex Addition | $64^2 = 4096$ | $64 \times 16 = 1024$ | $64(4\log_4 64) = 768$ |

Thus, the radix r FFT calculation clearly reduces the number of computations.

It would be beneficial if a technique could be developed to more efficiently perform radix r FFTs, particularly a technique that takes advantage of existing hardware thereby avoiding the need to develop or employ a dedicated digital signal processor, such as the Intel I860, to perform these transforms.

SUMMARY OF THE INVENTION

The present invention takes advantage of hardware normally used for graphics processing to perform radix r FFTs. More specifically, a texture subsystem in a graphics processing device can be adapted to provide the desired FFTs. In accordance with one embodiment of the present invention a radix 4 FFT building block is mapped to a texture filter of a texture subsystem such that the texture filter provides the FFT computational power without needing to employ a separate DSP.

In accordance with a further embodiment of the present invention, a texture memory addressing technique is employed to permit computation of a two dimensional FFT with a vector radix 2×2.

It is respectfully submitted that the specific types of radix FFTs are not to be limited to a radix four or a vector radix 2×2. Other radix-r FFTs may be employed to take advantage of the computation capabilities available in the texture subsystem so long as the appropriate memory addressing maps are employed.

BRIEF DESCRIPTION OF THE DRAWINGS

FIG. 14 illustrates a data array arrangement useful for describing an aspect of the present invention.

FIG. 15 illustrates a data array arrangement useful for describing another aspect of the present invention.

FIG. 16 illustrates a layout of output pixels in accordance with yet another aspect of the present invention.

DETAILED DESCRIPTION

Overview

The present invention provides a way to adapt existing graphics processing hardware to perform image processing operations directed to determining fast fourier transforms (FFTs). In accordance with the present invention, the graphics processing hardware includes a texture subsystem made up of, at least in part, texture memory and a plurality of texture filters. Each filter includes a computational array whose parameters can be selected to provide a "texture" to certain pixels that correspond to performing FFTs with respect to that pixel information. The remaining subsections of this section of the specification will set forth more details regarding the texture subsystem, how the computation of FFTs can be mapped to such a texture subsystem and how addressing techniques available in the subsystem can be used to select different types of FFT computations, e.g., a one dimensional FFT array, a vector radix 2×2 and others.

Figure 7:
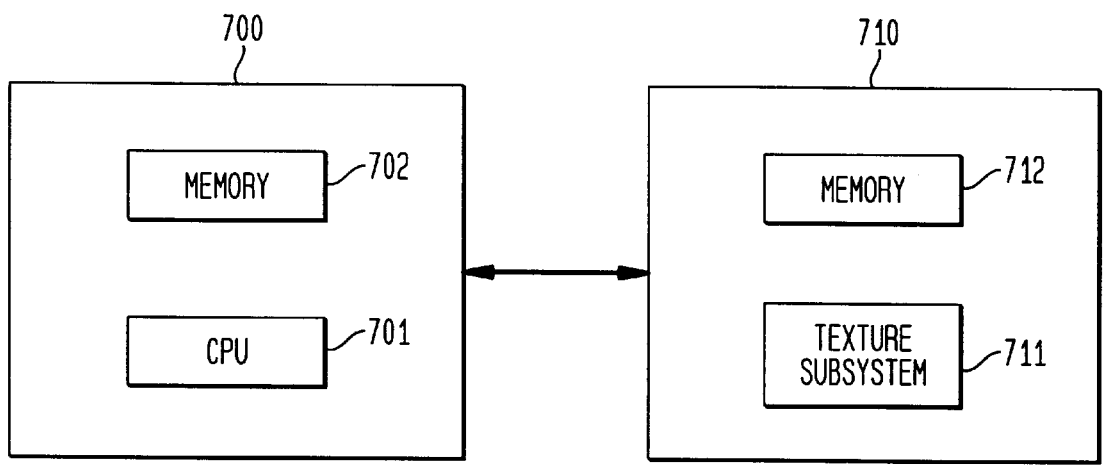
FIG. 7 provides a block diagram representation of an architecture for employing an embodiment of the present invention.

A block diagram representing an embodiment of a graphics device capable of implementing the present invention is shown in FIG. 7. A host 700 includes at least one central processing unit (CPU) 701, such as a MIPS R10000, and may include a plurality of CPUs. The host interfaces with a visualization subsystem 710 which includes a raster and texture engine or subsystem (hereinafter texture subsystem) 711 and memory 712. The memory can comprise any generic electronic memory device, such as SDRAM, and will hereinafter be referred to as the generic memory. The visualization subsystem includes an architecture, described below in relation to FIG. 9, for performing a core set of imaging operations as well as graphics operations. It is possible that multiple visualization subsystems could be coupled to the host 700 as shown.

It is helpful to understand how image data is typically transferred so as to understand how the embodiment of FIG. 7 can exploit the relationship between image processing and graphics processing.

Image data is typically transferred through such operations as drawing a pixel, reading a pixel, or copying a pixel, as well as through texture definitions. The source and destination of a pixel is dependent upon buffer definitions as well as the operation that is called, that is a draw operation, a read operation, a copy operation, or a texture load operation. In accordance with the invention, if any of the pixel modes are enabled then image data is processed through the graphics rendering system, more particularly through a texture filter and texture memory. More specifically, as described below, the graphics rendering system can effect FFTs related to image processing operations.

Figure 8:
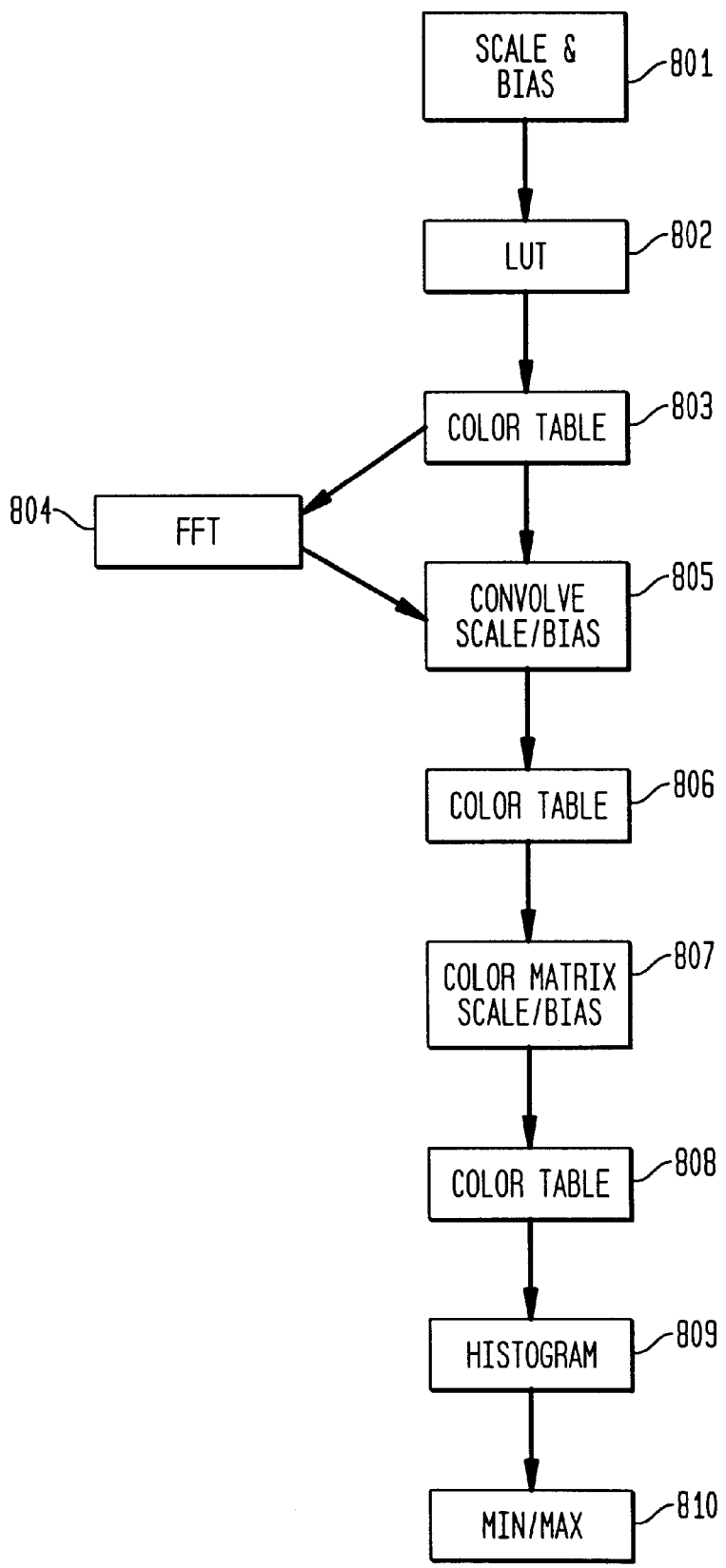
FIG. 8 provides an operation flow for image processing in the architecture of FIG. 7.
Figure 9:
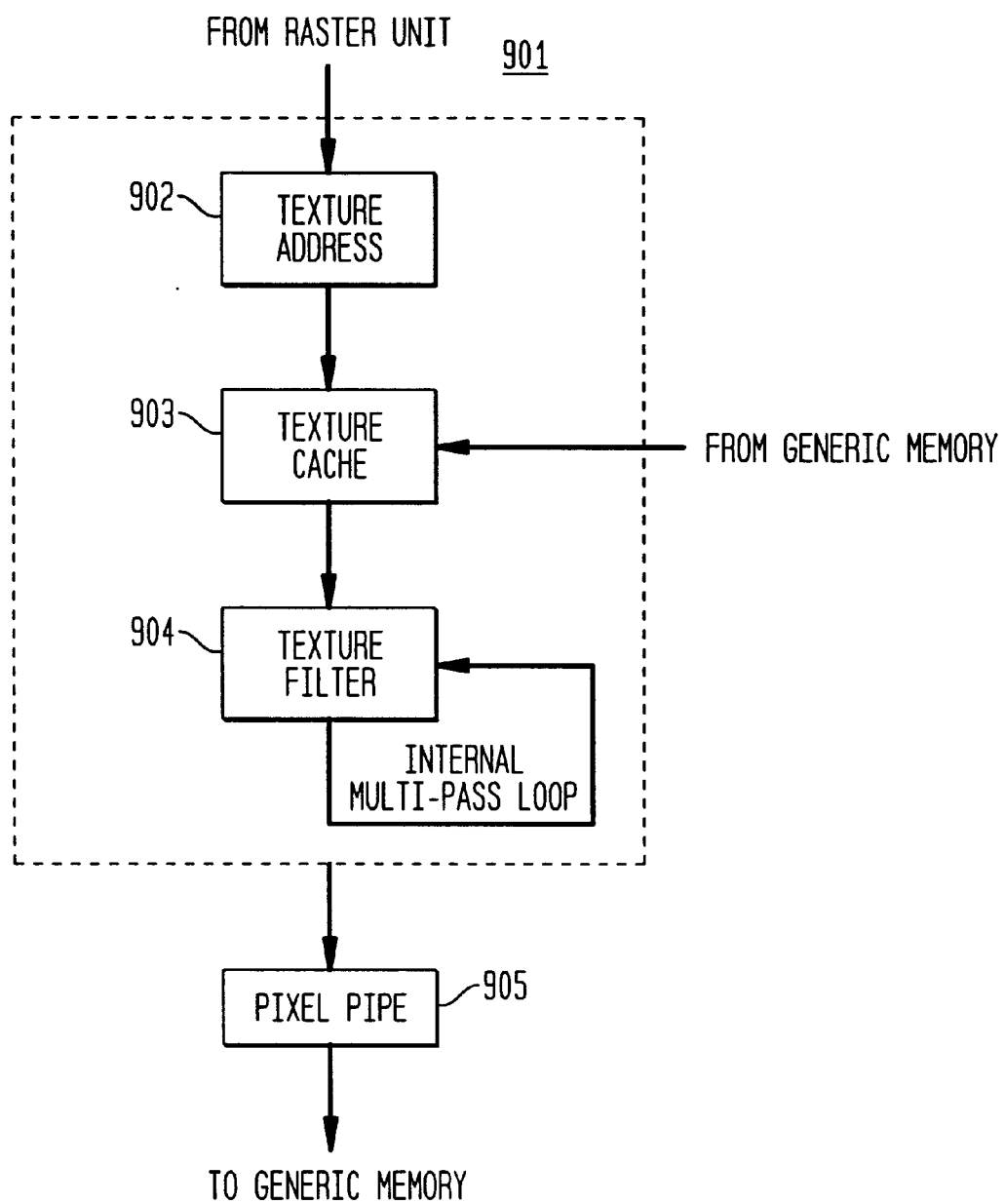
FIG. 9 provides a block diagram representation of modules relating to the architecture of FIG. 7.

FIGS. 8 and 9 illustrate a sample of pixel transfer modes as well as a block diagram representation of an architecture for a graphics rendering engine which can be utilized in connection with the pixel transfer modes.

An image can be subjected to a scale and bias operation 801. The result of that operation can then be used in a look-up table (LUT) operation in element 802. The look-up table can then be utilized in conjunction with the color table 803. The color table can then provide information to either a fast fourier transform (FFT) operation 804 or a convolve and scale and bias operation 805. A color table operation is then carried out in connection with module 806. A color matrix with scale and bias is the subject of module 807. Another color table operation is the subject of element 808. Then a histogram and minimum/maximum operation are performed in conjunction with modules 809 and 810 respectively.

Textures are stored in generic memory and faulted into the texture cache, 903 (see FIG. 9) as needed. Additionally, image data flows between the texture subsystem and generic memory as textures or-buffers (of all flavors, e.g., frame buffers, pbuffers, or accumulation buffers). Since image operations are processed by the texture filter, they must be defined as textures. This is a looser definition of traditional textures in that, since all data is stored in a unified memory, so long as there is conformance to texture formats, it is-possible to interchange buffers with textures when accessing them through the texture subsystem. That is, it is possible to allow the texture cache to fault in data even from other types of buffers. This can be important for obtaining optimal efficiency both in computation and storage.

Image data may be directed straight to generic memory by a command/format module (not shown) if there are no pixel transfer operations enabled. Like geometry, image data to be rendered is also passed through the raster unit (or onto the texture engine). This means that images are processed a quad at a time, that is four output pixels at a time. In one embodiment, the texture subsystem processes two pixels per clock and as a consequence a minimum of two clock cycles are required to process a quad of pixels.

From the raster unit, 901 of FIG. 9, output pixels are passed on to the texture subsystem and the pixel pipeline. Depending on the processing mode that is set table via a command interface, resulting pixels are either stored in a frame buffer cache, written back to memory or fed back to the raster unit for multipassing or for loading texture attributes through an attribute pipeline.

The block diagram of FIG. 9 shows a texture subsystem including: a texture address module 902, a texture cache 903, a texture filter 904; a pixel pipe 905. Lines are also shown representative of inputs for multipassing operations which will be described in greater detail later in the specification.

In summary, the operational elements of FIG. 8 can all be performable on the graphics engine or visualization subsystem whose representative architecture is shown in FIG. 9. As a consequence of the use of the visualization subsystem architecture with the modifications which will be described in greater detail below, it is possible to eliminate the use of dedicated image processing hardware such as DSPs or ASICs which otherwise increases system costs.

The graphics rendering engine includes a command module (not shown)that processes commands and reformats pixels and texels coming in and going out of the texture subsystem. Especially for imaging, a set of attributes have been defined to allow for more flexibility and programmability of the texture subsystem. The set of attributes allow for specifying:

1. Destination of output pixels to memory or back to the texture filter;
2. Texel address computation—using (x,y) coordinates or the RGBA value at (x,y) to compute the (s, t) address.
3. Texel traversal direction (that is a row versus column).
4. Texture subsystem employment that is, using the texture subsystem for look-up operations or for filter operations.
5. Enabling multipassing.
6. Texture filter register specification-preloading specific alpha coefficients to the individual lerps.

Since the texture subsystem is programmable, the command module also keeps track of the current "state" of the command first-in first-out (FIFO) buffer stored in memory (e.g. 712). This enables invoking multipass loops through the texture subsystem. Depending on the command attribute set, it is possible to choose to multipass externally or internally. When multipassing externally, output pixels are fed back to generic memory and faulted back into texture cache. While multipassing internally, output pixels are fed directly back to the texture filter. Multipassing will be described in connection with the operations of imaging processing mapped onto this architecture.

The pixel transfer operations illustrated in FIG. 8 can all be performed in the texture subsystem. In fact, application Ser. No. 956,537, earlier incorporated herein by reference describes how to map various ones of the image operations to the texture subsystem and those descriptions should be considered as part of the present disclosure. If any of the pixel transfer modes are enabled then data is passed through that subsystem.

The texture subsystem can be designed as a programmable engine that can be used to compute not just the resampling filters required by the graphics texture options, but to also support most of the imaging operations. There are four modes in which the texture subsystem can operate:

1. Default texturing—(x,y) coordinates are used to generate (s,t) coordinates;
2. Look-up from texture cache—the RGBA values at (x,y) coordinates are used to generate the (s,t) coordinates;
3. Texel traversal along the color dimension; and
4. Texel traversal along y,x-row/column dimension.

The texture subsystem includes the texture addressing unit, the texture cache and the texture filter as shown in FIG. 9.

Texture Addressing

The texture addressing unit (TA), shown as block 902 of FIG. 9, mainly determines what texels it must fetch from the cache. Pixels passed from the raster unit can be thought of as the output pixels used to generate the required texels to resample based on a set table mode.

In a default mode, the texture addressing unit uses the pixel coordinate (x,y,z) values to generate the texel address values. In a look-up mode, the texture addressing unit uses pixel RGBA values at a specified coordinate (x,y,z) to generate a texel address value.

In typical graphics texturing operation the texture addressing unit fetches texels from two textures, each texture representing a distinct level of detail (LOD). However, in the image processing case each LOD is the same or it can be used to also represent real and imaginary data. These two LODs are then used in texture filtering or imaging operations. This embodiment uses the first texture $LOD_0$ to represent the real components of a complex image, and texture $LOD_1$ to represent the imaginary data.

To properly compute the required texels to fault into cache, the TA can also accept an offset pair, one per LOD.

The default offset is (0,0), but can be changed per iteration or "passed" through the texture filter via the command interface.

Texture Filter

Figure 10:
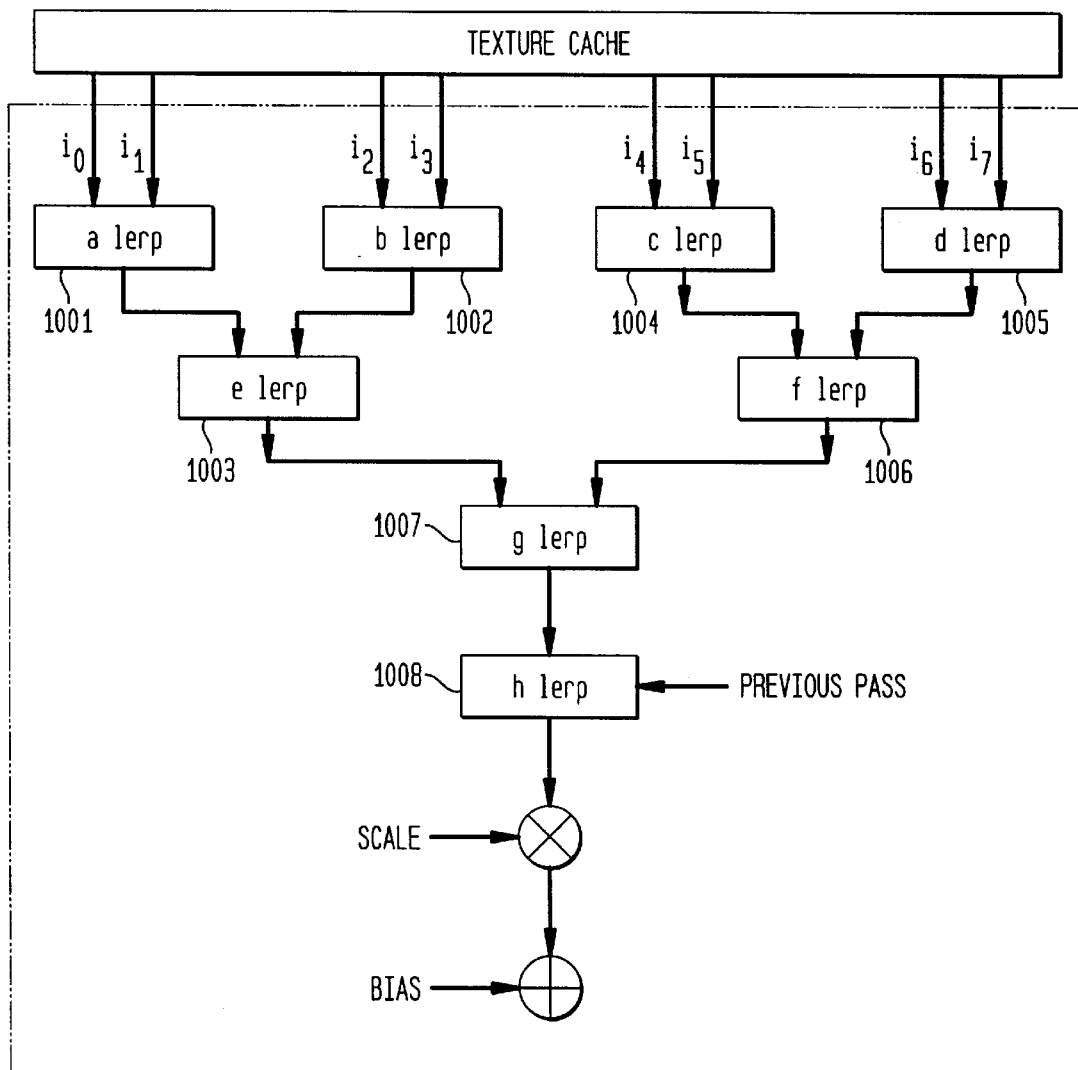
FIG. 10 illustrates an example of a texture filter such as that in FIG. 9.

The texture filter provides a set of linear interpolation arrays. An example of such an array is shown in FIG. 10. In the illustrated example there are eight linear interpolators or lerps. This array of eight linear interpolators can constitute a tri-linear interpolator. Such interpolators are utilized extensively within the texture filter. As is well known in the art, a tri-linear interpolator includes seven linear interpolators such as "a" to "g" (1001 to 1007) in FIG. 10. Lerps a, b, and e (1001, 1002 and 1003) form one bilinear interpolator. Lerps c, d, f (1004, 1005, 1006) form another bilinear interpolator. Two bilinear interpolators combine with a common linear interpolator, here linear interpolator "g" (1007) to form a tri-linear interpolator. Bilinear interpolators are used to interpolate texels in a 2D image. For example, linear interpolator "a" interpolates between input $i_0$ and input $i_1$. An interpolation ratio is determined by a "weight". An interpolation weight closer to 0.0 results in an interpolation output closer to $i_1$ while an interpolation weight closer to 1.0 results in an interpolation output closer to $i_0$. Each interpolation weight is referred to as a "lerp weight" and tri-linear interpolators are referred to as a "lerp tree". As is well known in the art bi-linear interpolation is conventionally used to interpolate between four texels to produce a blended color for a given fragment. Four texels which surround the s and t texture coordinates of interest are used to generate the texture color of each fragment. Two pairs of texels arranged in a 2×2 array, are each pair-wise interpolated horizontally to generate two new interpolates. These interpolates are then interpolated vertically to generate the final filtered texture color.

Tri-linear interpolation is used to interpolate between texels at different scales (that is level of detail). Thus, as is well known in the art, tri-linear interpolation interpolates between the output of two bi-linear interpolators. Hence the output of interpolator "e" and the output of interpolator "f" are interpolated by interpolator "g" to obtain a filtered color fragment. Thus a tri-linear interpolator is often referred to as a filter. Such filtering operations are the primary use of the hardware of the texture filter.

More specifically, the texture filter may provide a set of lerp arrays capable of computing the equivalent of eight normalized multiply-and-accumulate operations of some pre-determined bit length. To appropriately handle four pixels per two cycles, one design has a total of 8 lerp arrays, each set of 4 used to compute: one RGBA pixel. The lerp arrays along the color component dimension can be combined to improve precision. However, when using the lerp array in higher precision it is possible to process only monochrome data. With respect to imaging, the tree of interpolators, typically used to perform tri-linear interpolation, can be thought of as a normalized multiply-and-accumulate tree that allows up to eight inputs to be multiplied with eight normalized alpha (a) coefficients and accumulated at the end. By normalized it is meant that the alpha coefficients are positive values in the range from [0–1]. Each arithmetic element, or lerp, employs an alpha coefficient to interpolate between two given inputs (A and B) as shown in equation 17.

$$A\alpha + (1-\alpha)B \qquad (17)$$

As indicated above, FIG. 10 illustrates one such lerp array. The inputs may be signed or unsigned, however all alpha coefficients must not only be positive (that is unsigned) but also be normalized. To compensate for this, there is some extra hardware to allow for the negation of the second input, B and for swapping inputs A and B.

The last lerp "h" (1008) is typically used to interpolate between the current value and one computed from a previous pass. The alpha coefficient and input settings (negation and input swap) are all set table via the command interface. Each lerp array can be programmed independently through the command module.

Texels are fed into the lerp array from the texture cache. For each pixel there are 4 lerp arrays, one for each color (RGBA component). There are three ways in which texels are loaded:

1. Default texturing—RGBA texels are loaded into their corresponding lerp arrays with the column-dimension (x) being the fastest growing dimension;
2. Column order—RGBA texels are loaded into their corresponding lerp arrays with the row dimension (that is y) being the fastest growing dimension; and
3. Color addressing—each component of a texel, RGBA is loaded as the input into each of the lerp arrays. This is used to perform the color matrix operation.

The mapping of the imaging processing operations, and in particular an FFT operation, into the operation of the texture filter will be described in greater detail below.

Caches

The texture subsystem also provides cache memory. In one embodiment the texture subsystem provides 48K bytes of such memory.

Input image data is stored in memory and brought or faulted into the texture cache. As long as the data in memory conforms to the supported texture formats, it can be identified via the command module as a texture to be faulted into the texture cache (but can later be accessed as any other type of buffer). This obviates the need to provide redundant copies and the use of memory space as well as provides the required flexibility in using the texture subsystem as a pseudo-vector processor.

Data can be implicitly faulted into texture cache by the texture addressing module, or it can be explicitly loaded via the command interface. Typically, a tile of 16 texels is faulted into the cache. The footprint of this tile is dependent on the dimensionality and type of operation being performed. However, for look-up operations, the entire look-up table must be completely loaded into the cache.

To obtain maximum performance from the texture subsystem image operations are performed in a "mipmapping" addressing mode. This means that for each lerp array the texture addressing unit generates four inputs from one level of detail (LOD) and the remaining four inputs from the second LOD. The implication is that the system must redundantly load the input data into each LOD, or in the FFT case, one LOD represents the real components of the image and the second one represents the imaginary components of the image.

For 2D operations, when texels are extracted from texture cache they are extracted in a 2×2 footprint from each LOD. So, when computing the number of passes required to perform a 2D operation one must account for the notion that only a maximum of eight texels, four from each LOD are being extracted.

For look-up tables, in order to avoid address aliasing between the two pixels, it is necessary to duplicate the look-up table so that each pixel is addressing a different table. To fully support 12-bit look up tables, the texture cache must have a minimum of 48K bytes. A 12-bit RGBA look-up table in texture cache requires four components× twelve bits×4096 entries×two pixels. So, when performing a look-up operation resulting in a 12-bit RGBA pixel, all of the texture cache must be allocated as look-up table.

An additional frame buffer cache can be used as another temporary repository for holding post (texture and pixel-pipe) processed data. This cache can potentially reduce the latency and overhead introduced by having to read/write/modify to generic memory.

Pixel Pipe

The pixel pipe provides the ability to blend and/or accumulate pixels. Of particular importance, this is where it is expected to compute some of the dyadic operations such as add, subtract, and multiply images (even in the complex domain). Additionally, since in most imaging operations (like convolve) it is necessary to accumulate the results of each multi-pass, it is therefore possible to employ the accumulation logic of the pixel pipe module to accomplish the desired results.

Multipassing

As has been described above, the texture subsystem provides several ways in which to multipass to make more effective use of a lerp array as an eight-input multiply-and-accumulate processor. For instance, an internal multipass can be provided to effectively allow operations requiring more than eight inputs to be combined through the use of multiple passes. The resulting texel is immediately fed back to the texture filter as the second input to the h lerp of FIG. 10. Internal multipassing effectively allows the use of the lerp arrays, result to be fed to as the second input into the h lerp of the next immediate pass. An external multipass will store the resulting texel to memory and then faults it back into texture cache at either the next or some later pass. Each of these two modes are set table through the command interface.

Having further described the texture subsystem components the detailed description will now focus on the mapping of individual imaging operators, specifically FFTs, into this architecture.

Mapping FFT to Odyssey

As there is no internal format support for complex data in the texture subsystem, the complex data is stored as a texture with two level of detail (LOD) entries. The system can take advantage of the 2-LOD texture cache addressing to reference the real $f_R(n)$ and the imaginary $f_1(n)$ portions of the complex data. In each stage, it requires two passes to compute the outputs $F(k)$, one for real portion $F_R(n)$, and another for the imaginary portion $F_1(k)$.

Figure 11:
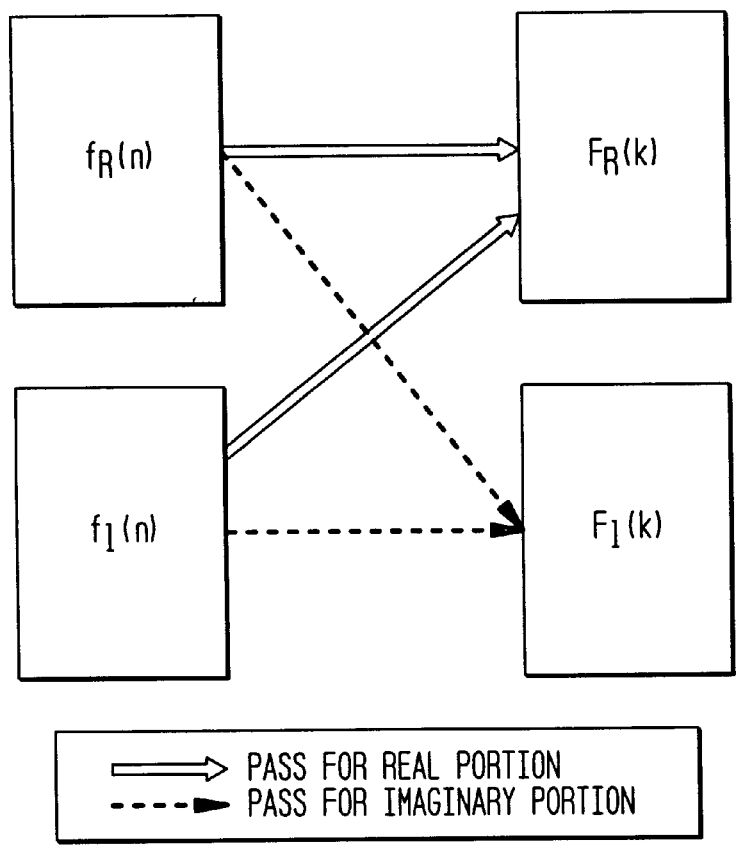
FIG. 11 illustrates a flow diagram for describing operations for processing real and imaginary inputs.

FIG. 11 shows a flow for performing this two pass computation. As can be seen the input is constituted by two components $f_R(n)$ and $f_1(n)$ each component contributes to both components of the outputs $F_R(k)$ and $F_I(k)$. More specifically $f_R(n)$ and $f_I(n)$ contribute to $F_R(k)$ in a pass for the real portion of the output while both $f_R(n)$ and $f_I(n)$ further contribute to $F_I(k)$ in a pass for the imaginary portion.

The two LODs provide the full data for 4 complex texels. Thus, the texture filter can be programmed to compute a 4-point FFT with each of the lerp arrays in a given filter being capable of generating a single 4-point FFT. If the texture subsystem includes four texture filters then two 4-point FFTs can be computed in two clocks (since a texture filter consists of four lerp arrays). With the texture filters programmed as 4-point FFT building blocks, Radix-4 FFT will make the best use of the filters. Cases where N (the size of the input matrix) is an odd power of 2 are special cases and will be described separately.

4-Point FFT Building Blocks

This section describes how to map a 4-point FFT building block to the above described texture filter.

f(n) is a complex number which can be represented as $f(n)=f_R(n)+jf_1(n)$. To compute each of the nth 4-point FFT for an array f(n) of size N, the following 8 inputs are needed:

$$f_R(kN/4+n) \quad k=0,1,2,3 \quad n=0,\ldots,N/4-1$$

$$f_i(kN/4+n) \tag{18}$$

Figure 12:
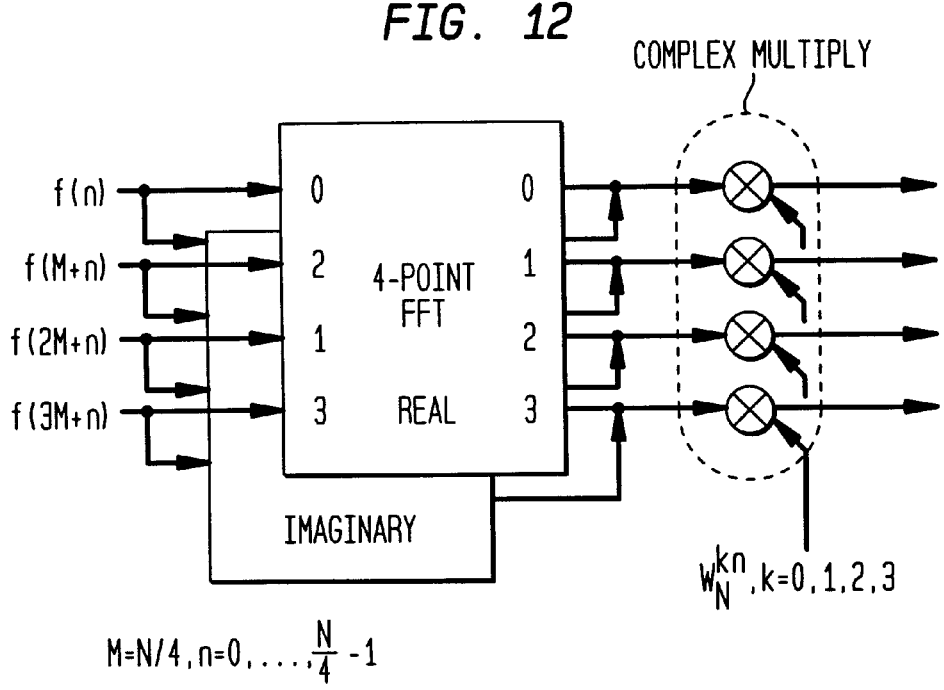
FIG. 12 illustrates a 4-Point FFT building block in accordance with an embodiment of the present invention.

Input data are fed into the following 4-point FFT building block shown in block diagram form in FIG. 12.

Figure 13:
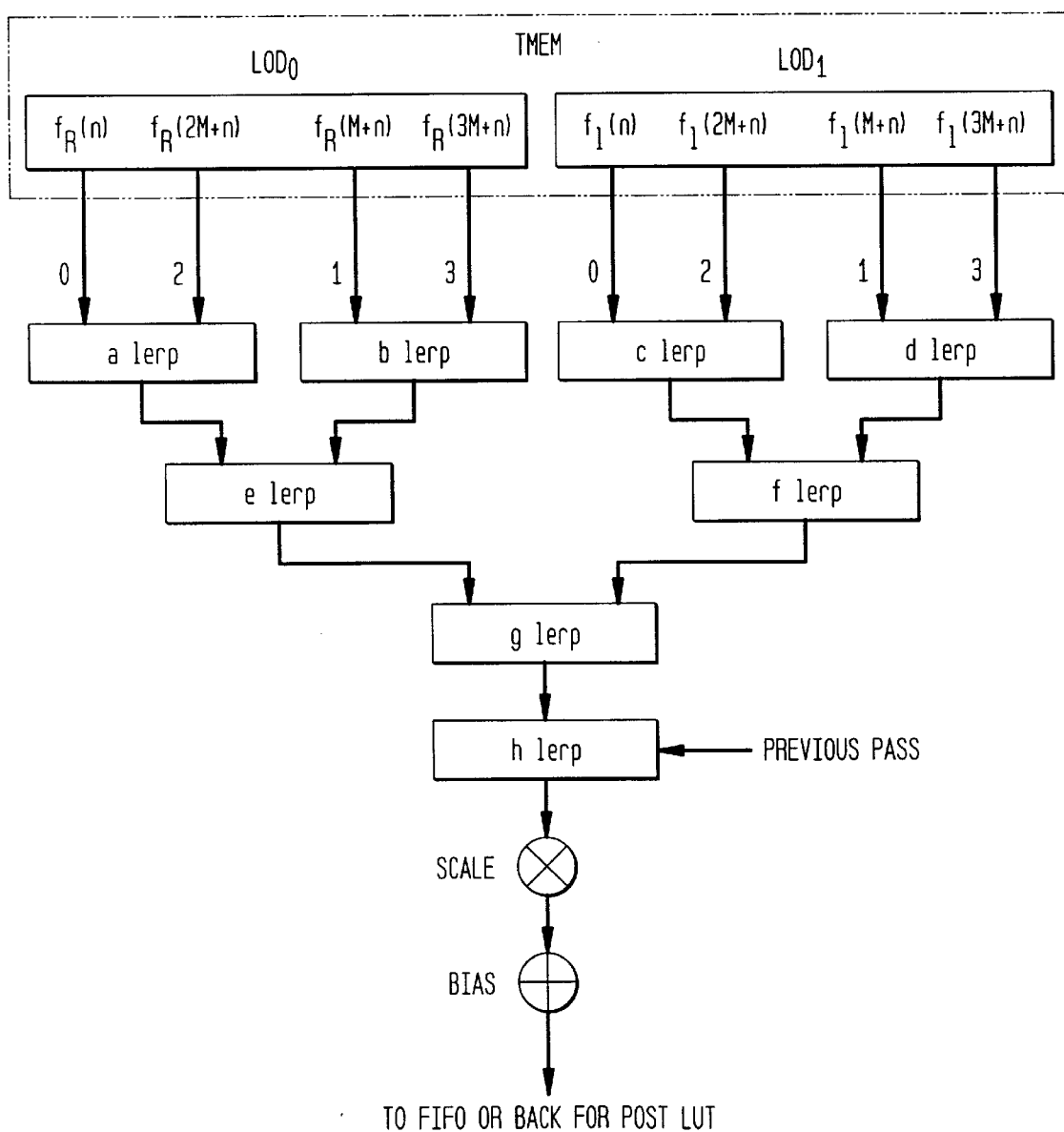
FIG. 13 illustrates an example of a texture filter for performing a 4-Point FFT in accordance with an embodiment of the present invention.

The 4-point FFT building block may be embedded in the lerp arrays as shown in FIG. 13.

This figure is similar to that shown in FIG. 10, except that the inputs to the Lerp arrays have been more specifically defined to correspond to the real and imaginary data input components used to calculate FFTs.

Let the eight outputs of the 4-point FFT building block be $d_R(k)$, $d_I(k)$, k=0, 1,2,3.

Then the output can be computed in the following 4 steps:

Step 1

$$\begin{aligned} a_R(0) &= f_R(n) & a_I(0) &= f_I(n) \\ a_R(1) &= f_R(M+n) & a_I(1) &= f_I(M+n) \\ a_R(2) &= f_R(2M+n) & a_I(2) &= f_{II}(2M+n) \\ a_R(3) &= f_R(3M+n) & a_I(3) &= f_I(3M+n) \end{aligned} \tag{19}$$

Step 2

$$\begin{aligned} b_R(0) &= a_R(0) + a_R(2) & b_I(0) &= a_I(0) + a_I(2) \\ b_R(1) &= a_R(0) - a_R(2) & b_I(1) &= a_I(0) - a_I(2) \\ b_R(2) &= a_R(1) + a_R(3) & b_I(2) &= a_I(1) + a_I(3) \\ b_R(3) &= a_R(1) - a_R(3) & b_I(3) &= a_I(1) - a_I(3) \end{aligned} \tag{20}$$

Step 3

$$\begin{aligned} c_R(0) &= b_R(0) + b_R(2) & c_I(0) &= b_I(0) + b_I(2) \\ c_R(1) &= b_R(1) + b_I(3) & c_I(1) &= b_I(1) - b_R(3) \\ c_R(2) &= b_R(0) - b_R(2) & c_I(2) &= b_I(0) - b_I(2) \\ c_R(3) &= b_R(1) - b_I(3) & c_I(3) &= b_I(1) + b_R(3) \end{aligned} \tag{21}$$

Step 4

$$\begin{aligned} d_R(0) &= c_R(0) & d_I(0) &= c_I(0) \\ d_R(1) &= \cos\left(\frac{2\pi n}{N}\right)c_R(1) + \sin\left(\frac{2\pi n}{N}\right)c_I(1) \\ d_I(1) &= \cos\left(\frac{2\pi n}{N}\right)c_I(1) - \sin\left(\frac{2\pi n}{N}\right)c_R(1) \\ d_R(2) &= \cos\left(\frac{4\pi n}{N}\right)c_I(2) + \sin\left(\frac{4\pi n}{N}\right)c_I(2) \\ d_I(2) &= \cos\left(\frac{4\pi n}{N}\right)c_I(2) - \sin\left(\frac{4\pi n}{N}\right)c_R(2) \\ d_R(3) &= \cos\left(\frac{6\pi n}{N}\right)c_I(3) + \sin\left(\frac{6\pi n}{N}\right)c_R(3) \\ d_I(3) &= \cos\left(\frac{6\pi n}{N}\right)c_I(3) - \sin\left(\frac{6\pi n}{N}\right)c_R(3) \end{aligned} \tag{22}$$

Ideally, step 1 and step 2 are carried out at lerps a, b, c and d, (1301, 1302, 1303 and 1304) step 3 is carried out at lerps e and f, (1305 and 1306) and finally step 4 is computed at lerp g, as shown in Table 3:

TABLE 3

| lerp | Inputs | Outputs |
|---|---|---|
| lerp a | $a_R(0), a_R(2)$ | $b_R(0), b_R(1)$ |
| lerp b | $a_R(1), a_R(3)$ | $b_R(2), b_R(3)$ |
| lerp c | $a_I(0), a_I(2)$ | $b_I(0), b_I(1)$ |
| lerp d | $a_I(1), a_I(3)$ | $b_I(2), b_I(3)$ |
| lerp e | $b_R(i), i = 0, \ldots, 3$ | $C_R(0), C_R(2), g_R(1),$ $g_R(3) h_R(1), h_R(3)$ |
| lerp f | $b_I(i), i = 0, \ldots, 3$ | $c_I(0), c_I(2), g_I(1), g_I(3)$ $h_I(1), h_I(3)$ |
| lerp g | $C_R(i), c_I(i), i = 0, 2$ $g_R(i), g_I(i), i = 1, 3$ $h_R(i), h_I(i), i = 1, 3$ | $d_R(i), d_I(i), i = 0, \ldots, 3$ |

$c_R(1)$, $c_R(3)$ and $c_I(1)$, $c_I(3)$ are missing in Table 3 where they have been replaced with $g_R(i), g_I(i), h_R(i), h_I(i)$. This is because they are computed using one input among $b_R(i)$, i=1,3, and another input among $b_I(i)$, i=1,3. The computations of $d_R(i), d_I(i)$, i=1,3 in terms of $b_R(i), b_I(i)$ can be written as $$d_R(1) = [c_1 b_R(1) - s_1 b_R(3)] + [s_1 b_I(1) + c_1 b_I(3)]$$

$$d_I(1) = -[s_1 b_R(1) + c_1 b_R(3)] + [c_1 b_I(1) - s_1 b_I(3)]$$

$$d_R(3) = [c_3 b_R(1) - s_3 b_R(3)] + [s_3 b_I(1) - c_3 b_I(3)]$$

$$d_I(3) = [s_3 b_R(1) + c_3 b_R(3)] + [c_3 b_I(1) + s_3 b_I(3)] \quad (23)$$

while using the following shorthands:

$$c_1 = \cos\left(\frac{2\pi n}{N}\right) \quad c_2 = \cos\left(\frac{4\pi n}{N}\right) \quad c_3 = \cos\left(\frac{6\pi n}{N}\right) \quad (24)$$

$$s_1 = \sin\left(\frac{2\pi n}{N}\right) \quad s_2 = \sin\left(\frac{4\pi n}{N}\right) \quad s_3 = \sin\left(\frac{6\pi n}{N}\right)$$

Let $$g_R(1) = c_1 b_R(1) - s_1 b_R(3) \quad g_I(1) = s_1 b_R(1) + c_1 b_I(3)]$$

$$h_R(1) = -s_1 b_R(1) - c_1 b_R(3) \quad h_I(1) = c_1 b_I(1) - s_1 b_I(3)$$

$$g_R(3) = c_3 b_R(1) + s_3 b_R(3) \quad g_I(3) = s_3 b_I(1) - c_3 b_I(3)$$

$$h_R(3) = s_3 b_R(1) + c_3 b_R(3) \quad h_I(3) = c_3 b_I(1) + s_3 b_I(3) \quad (25)$$

The lerp array settings for each of the 8 outputs can be computed as follows.

Lerp array settings for computing $d_R(0)$:

| lerp | alpha ( ) | negate | swap |
|---|---|---|---|
| lerp a | 0.5 | False | False |
| lerp b | 0.5 | False | False |
| lerp c | 0.5 | False | False |
| lerp d | 0.5 | False | False |
| lerp e | 0.5 | False | False |
| lerp f | 0.5 | False | False |
| lerp g | 1 | False | False |
| lerp h | 1 | False | False |
| | scale | bias | |
| | 4 | 0 | |

Lerp array settings for computing $d_I(0)$:

| lerp | alpha ( ) | negate | swap |
|---|---|---|---|
| lerp a | 0.5 | False | False |
| lerp b | 0.5 | False | False |
| lerp c | 0.5 | False | False |
| lerp d | 0.5 | False | False |
| lerp e | 0.5 | False | False |
| lerp f | 0.5 | False | False |
| lerp g | 1 | False | True |
| lerp h | 1 | False | False |
| | scale | bias | |
| | 4 | 0 | |

Lerp array settings for computing $d_R(1)$:

| lerp | alpha ( ) | negate | swap |
|---|---|---|---|
| lerp a | 0.5 | True | False |
| lerp b | 0.5 | True | False |
| lerp c | 0.5 | True | False |
| lerp d | 0.5 | True | False |
| lerp e | $|c_1|/(|c_1|+|s_1|)$ | | |
| lerp f | $|c_1|/(|c_1|+|s_1|)$ | | |
| lerp g | 0.5 | | |
| lerp h | 1 | | |
| | scale | bias | |
| | $4 (|c_1|+|s_1|)$ | 0 | |

Lerp array settings for computing $d_I(1)$:

| lerp | alpha ( ) | negate | swap |
|---|---|---|---|
| lerp a | 0.5 | True | False |
| lerp b | 0.5 | True | False |
| lerp c | 0.5 | True | False |
| lerp d | 0.5 | True | False |
| lerp e | $|c_1|/(|c_1|+|s_1|)$ | | |
| lerp f | $|c_1|/(|c_1|+|s_1|)$ | | |
| lerp g | 0.5 | | |
| lerp h | 1 | False | False |
| | scale | bias | |
| | $4 (|c_1|+|s_1|)$ | 0 | |

Lerp array settings for computing $d_R(2)$:

| lerp | alpha ( ) | negate | swap |
|---|---|---|---|
| lerp a | 0.5 | False | False |
| lerp b | 0.5 | False | False |
| lerp c | 0.5 | False | False |
| lerp d | 0.5 | False | False |
| lerp e | 0.5 | True | False |
| lerp f | 0.5 | True | False |
| lerp g | $|c_2|/(|c_2|+|s_2|)$ | | |
| lerp h | 1 | False | False |
| | scale | bias | |
| | $4 (|c_2|+|s_2|)$ | 0 | |

Lerp array settings for computing $d_I(2)$:

| lerp | alpha ( ) | negate | swap |
|------|-----------|--------|------|
| lerp a | 0.5 | False | False |
| lerp b | 0.5 | False | False |
| lerp c | 0.5 | False | False |
| lerp d | 0.5 | False | False |
| lerp e | 0.5 | True | False |
| lerp f | 0.5 | True | False |
| lerp g | $|c_2|/(|c_2|+|s_2|)$ | | |
| lerp h | 1 | | |
| | scale | bias | |
| | 4 $(|c_2|+|s_2|)$ | 0 | |

Lerp array settings for computing $d_R(3)$:

| lerp | alpha ( ) | negate | swap |
|------|-----------|--------|------|
| lerp a | 0.5 | True | False |
| lerp b | 0.5 | True | False |
| lerp c | 0.5 | True | False |
| lerp d | 0.5 | True | False |
| lerp e | $|s_3|/(|c_3|+|s_3|)$ | | |
| lerp f | $|s_3|/(|c_3|+|s_3|)$ | | |
| lerp g | 0.5 | | |
| lerp h | 1 | False | False |
| | scale | bias | |
| | 4 $(|c_3|+|s_3|)$ | 0 | |

Lerp array settings for computing $d_I(3)$:

| lerp | alpha ( ) | negate | swap |
|------|-----------|--------|------|
| lerp a | 0.5 | True | False |
| lerp b | 0.5 | True | False |
| lerp c | 0.5 | True | False |
| lerp d | 0.5 | True | False |
| lerp e | $|s_3|/(|c_3|+|s_3|)$ | | |
| lerp f | $|s_3|/(|c_3|+|s_3|)$ | | |
| lerp g | 0.5 | | |
| lerp h | 1 | False | False |
| | scale | bias | |
| | 4 $(|c_3|+|s_3|)$ | 0 | |

Reviewing the above settings the alpha values of lerp e, lerp f, and lerp g change while those of a, b, c, and d remain the same throughout. Furthermore, the alphas of lerp e and lerp f are always the same for a given computation. The minimal information we need to keep track of are 1. the alphas of lerps e, f, g and h
2. negate and swap bits of all lerps
3. scale Thus, the tricky part in determining lerp settings happens at lerps e, f, g and h. Basically what is desired is that the lerps perform $$C = cA + sB \qquad (26)$$

where A and B are two inputs. The weights c and s are determined using Equation 20 and Equation 23. Since the alpha value for the lerp must be positive, we need to rewrite Equation 24 as $$cA + sB = |c| sgn\ (c)A + |s| sgn(s)B \qquad (27)$$

The negate and swap bits can be determined by $$negateB = neg(c) \oplus neg(s)$$

$$swap = neg(c) \wedge \text{-}neg(s) \qquad (28)$$

From the swap bit, the alpha can be calculated by $$\alpha = \begin{cases} \dfrac{|s|}{|c|+|s|} & \text{if swap is true} \\ \dfrac{|c|}{|c|+|s|} & \text{otherwise} \end{cases} \qquad (29)$$

Problems may arise where both c and s are negative. The lerps must be programmed as if both c and s are positive, and the correct negation must be left to the lerp that is connected to it. A special bit negate can be used as an indicator that the output of the lerp should be somehow negated $$negateC = neg(c) \wedge neg\ (s) \qquad (30)$$

Under this scheme, the weights of the current lerp have to be negated according to the negate C bits of the lerps that send their outputs to A and B, respectively. Let the adjusted weights be c* and s*. The final solution to the determination of the lerp settings is as follows $$negateB = neg(c^*) \oplus neg\ (s^*)$$

$$swap = neg(c^*) \wedge \text{-}neg\ (s^*)$$

$$negateC = neg(c^*) \wedge neg\ (s^*) \qquad (31)$$

$$\alpha = \begin{cases} \dfrac{|s*|}{|c*|+|s*|} & \text{if swap is true} \\ \dfrac{|c*|}{|c*|+|s*|} & \text{otherwise} \end{cases} \qquad (32)$$

Architecture Supports for Using the Texture Subsystem

To compute each of the F(m, p) p=0, 1, . . . N−1 inputs are needed from f(m, l)=f(Ml+m), l=0, . . . ,N−1 which are distributed across the whole data array with a stride M that is a power of 2. In the early stages the stride is usually so large that the inputs cannot be loaded into the same cache line. Also, when the stride is a power of two, inputs may be loaded into the same cache line locations and cause cache thrashing. Furthermore, even if all of the required input data are in the same SDRAM tile in one design cache efficiency is improved by loading textures as tiles, e.g., 16×16 pixels, when the SDRAM tile is faulted in the texture cache, the input data may not be arranged in a desired footprint so that they can be extracted simultaneously.

The texture/raster subsystem is designed to exploit data locality as described in co-pending application entitled "System and Method for Rendering an Image" assigned to the assignee of the present application, the disclosure of which is hereby incorporated by reference. It is therefore important to improve the locality of our data. The Background described developing FFT by arranging 1-D data in a 2-D array. It is only a conceptual design used in some DSP textbooks to demonstrate the structure of FFT. However, since the texture addressing hardware in the present invention provides 2-D data locality, it is possible to restride the 1-D data f(n) into a 4-by-N/4 2-D texture by splitting the data array into 4 lines and stacking them up. Each of the 4 inputs f(k./4+n), k=0, 1, 2, 3 is grouped into a 4-by-1 column in which all 4 pixels are in the same cache line, and interleaves into different cache line locations. An example of this arrangement for a 64 point FFT is shown in FIG. 14.

The 2-D texture f(s, t) is related to f(n) by $$f(n)=f(d_{q-1}\, d_{q-2}\ldots d_1 d_0)=f(d_{q-2}\ldots d_1 d_0, d_{q-1})=f(s,t) \quad (33)$$

where $$s=d_{q-2}\ldots d_1 d_0,\ t=d_{q-1}$$

Figure 1:
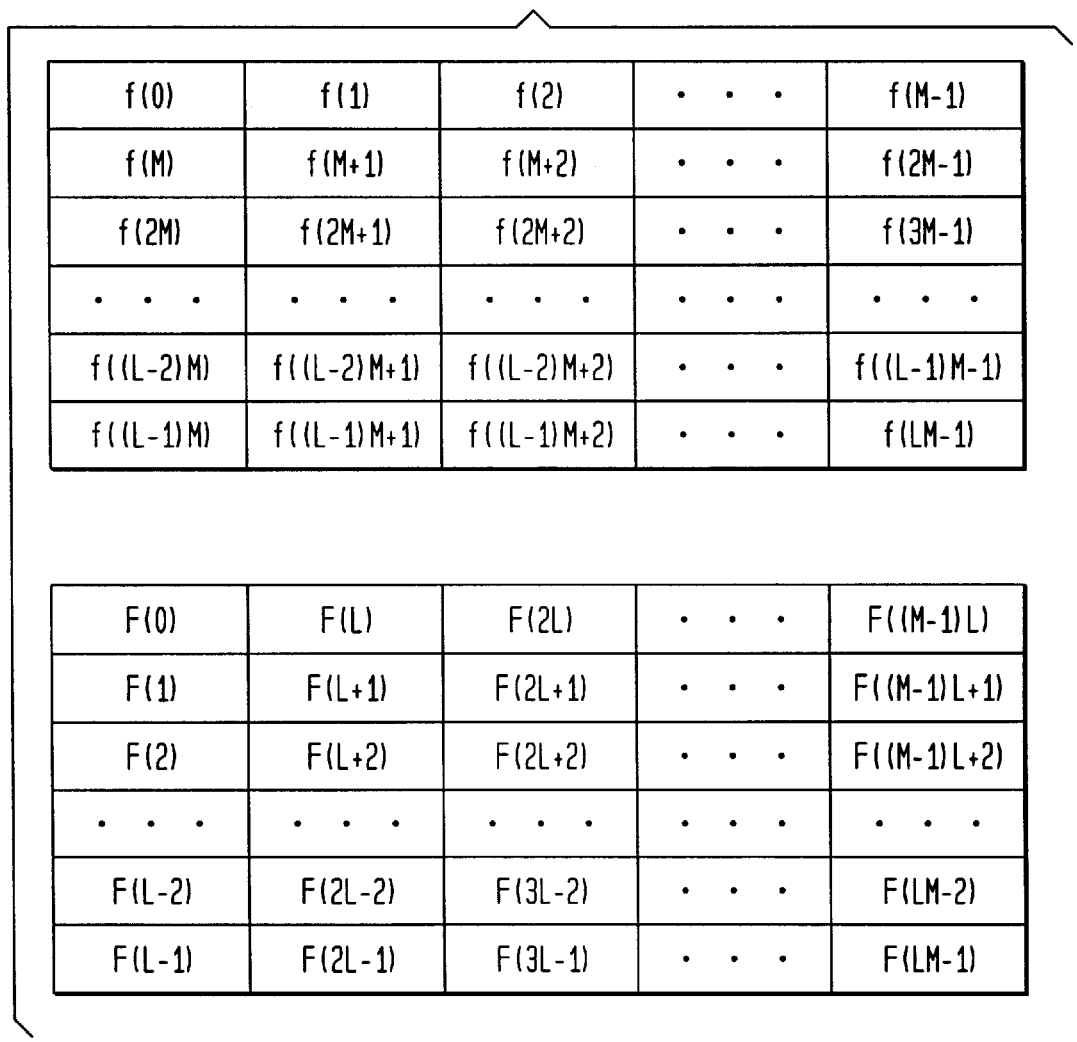
FIG. 1 illustrates an input array and an output array for describing two dimensional arrays of discrete Fourier Transforms (DFT).
Figure 2:
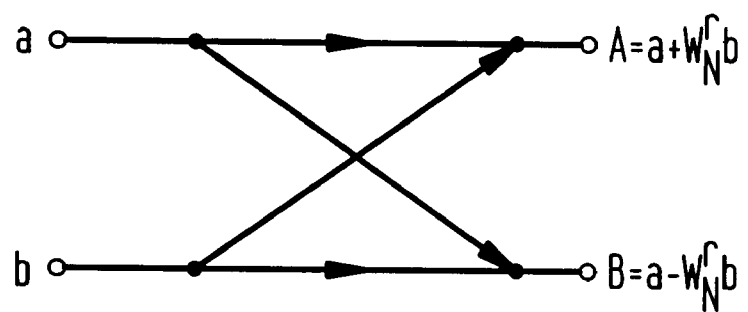
FIGS. 2 and 3 are illustrations related to an explanation of butterfly computations.
Figure 3:
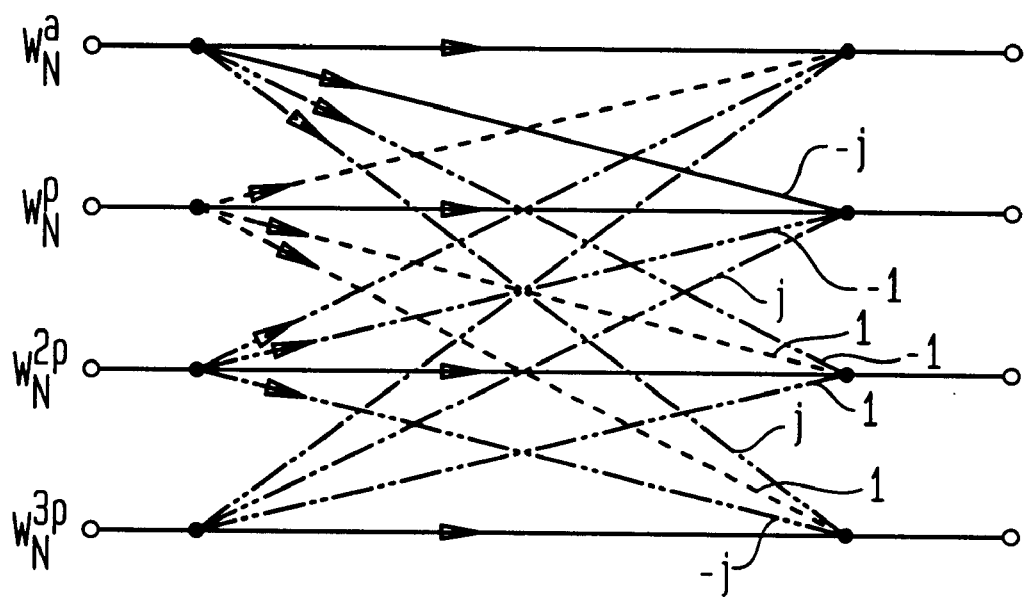
Figure 4:
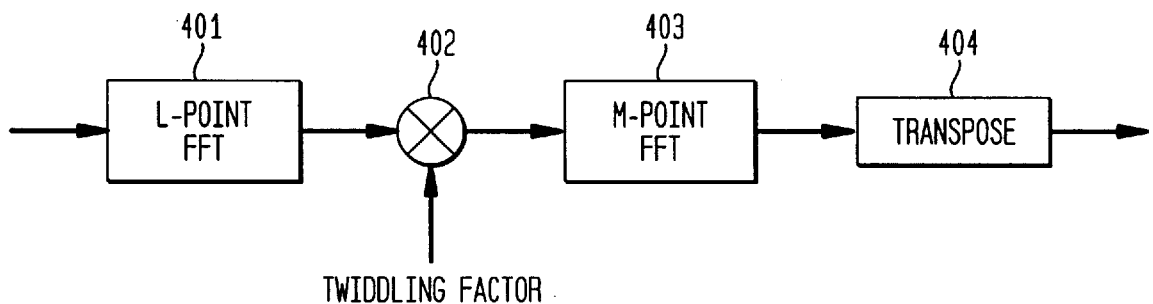
FIG. 4 illustrates a block diagram of an arrangement for performing fast Fourier transforms.
Figure 5:
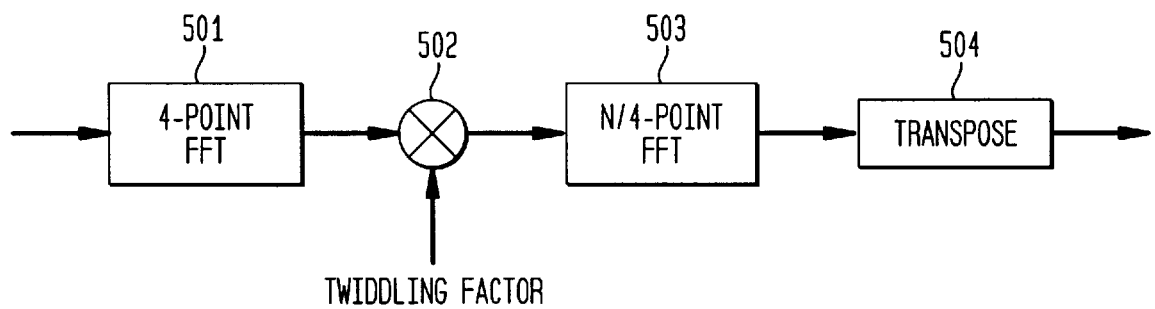
FIG. 5 illustrates a block diagram of another arrangement for performing fast Fourier transforms.
Figure 6:
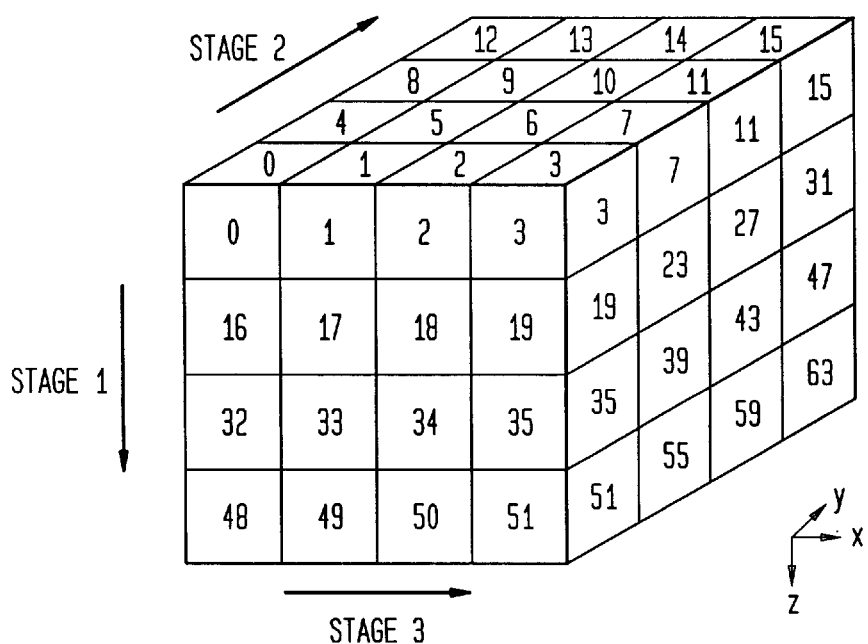
FIG. 6 illustrates a hypercube useful for understanding a calculation of a 64 point fast Fourier transform.

The t dimension corresponds to the last dimension of the hypercube representation of the data array (such as shown in FIG. 6), and the rest of the dimensions are unfolded along the s dimension. The 4-point FFT is always applied along the last dimension of the hypercube or, equivalently, the t dimension of the 2-D texture representation).

Footprint Quadration

All FFT output pixels require a column of 4 texels in the restrided 2-D texture shown in FIG. 14. Using texture mapping terminology, each of the output pixels has a 4-by-1 footprint in the texture. However, in the texture subsystem of the present invention, texels are extracted in a 2-by-2 footprint from each of the two LODs. The 4-by-1 footprint can be quadrated into a 2×2 footprint during cache load. Each column in the original texture is organized as a 2-by-2 quad in cache, with 16 columns stacked into 4 rows of 4 quads as shown in FIG. 15.

Under footprint quadration, the 2-D texture is now seen as a texture "squashed" by 2× horizontally, and "stretched" by 2× vertically from the originally one.

Nearest-quad Addressing Mode

To produce the output pixels or, in 3-D graphics terminology, to rasterize for the output pixels, use nearest-quad mode for addressing input texels, and then stretch horizontally and squash vertically back to the original sizes before quadration (see FIG. 16 for an example). The hardware for nearest-quad addressing is just an AND gate on the first integer bits of the texture coordinate.

Reordering and Unstriding

The above three mechanisms, (restriding, footprint quadration and nearest-quad addressing), used to support FFT in the texture subsystem of the present invention transpose each of the columns in the restrided input data represented as a 2D texture.

More specifically:

Data restriding rearranges a single input line as a 2-D texture;

Footprint quadration transforms each 4-by-1 column into a 2-by-2 quad.

Nearest-quad addressing rasterizes four output pixels by addressing the nearest quad in the texture.

This indirectly transposes each of the columns in the restrided input data represented as a 2-D texture. Thus, a final fourth step is required to rearrange the output data so that the final pixels are stored in their corresponding addresses.

Figures 17, 18:
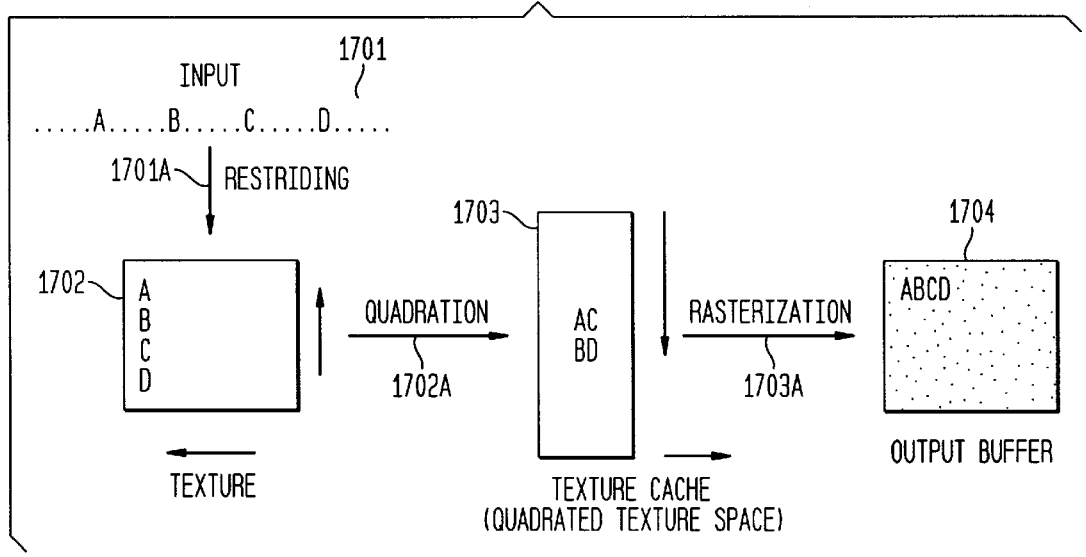
FIG. 17 illustrates a pipeline for computing FFTs in accordance with an embodiment of the present invention.
FIG. 18 illustrates a layout of output pixels in accordance with yet another aspect of the present invention.
Figure 19:
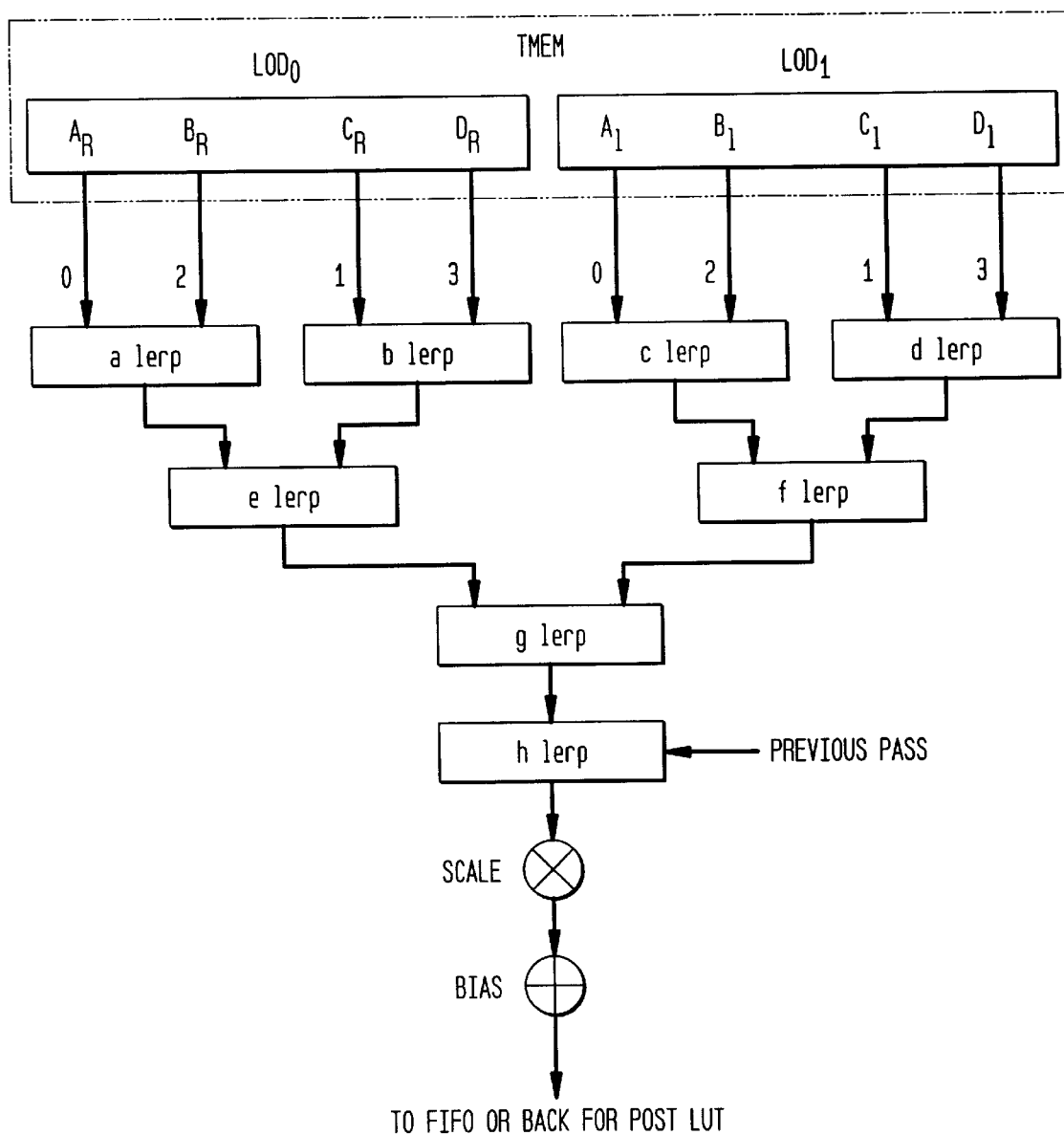
FIG. 19 illustrates an example of a texture filter for performing a 2×2 butterfly FFT in accordance with an embodiment of the present invention.

FIG. 17 demonstrates the data rearrangement through the above mechanisms.

Input data first comes as a ID sequence (A, B, C, D . . . ) as shown in 1701, it must then be restrided into a 2D sequence (1701A) and stored as a 2D texture (1702). Since the texture subsystem uses a 2×2 footprint, the required 4×1 column (1702) of data must then be transposed (1702A) into a 2×2 quad (1703). These "quadrated" texels (1703) are then used to compute the FFTs using the radix-4 algorithm. The resulting texels are rasterized (1703A) and stored in a scanline order (1704). It is this final scanline order (1704) that is transposed and must then be reordered so that the final data is stored in their corresponding addresses.

So far, we have only addressed the issues in a single stage of an FFT computation. Most FFT computations are multi-stage. A further step of divide-and-conquer recursion introduces an extra FFT stage with a new stride ¼ of the previous one.

Note that in the output image shown in FIG. 14, the pixels in each of the 4-by-1 columns now are separated stride of 16, which is ¼ of the previous one. Each of the columns thus has the 4 inputs necessary to compute some output pixels for the next stage. This means that we do not have to restride the outputs to create the texture for the next FFT stage. The same can be applied to the next stage. The quadrated texture from that in FIG. 16 is shown in FIG. 18.

The rasterized output image is shown in FIG. 18. Now the pixels in each of the 4-by-1 columns are separated by stride 1, which is the size of stride for the third stage of the FFT for a 64 long data. Again, no restriding is necessary. It is only necessary to restride the data for the first stage.

In implementing the present invention it is possible to either reorder the data before or after the FFT computation, or transpose the intermediate results of each stage. The kind of transpose in the FFT pipeline is not a complete transpose since the transpose is relative to all other dimensions using the hypercube representation $$d_{q-1}\, d_{q-2}\ldots d_1 d_0 \rightarrow d_0 d_1\ldots d_{q-2} d_{q-1} \quad (34)$$

It can be seen that after the last stage of the FFT is completed, the data will be in the original order. This means that it will be necessary to reorder the data. In addition, the data will also have to be unstrided from the strided one. It is desirable to do the following coordinate transform using hypercube representation of the data $$d_{q-1} d_{q-2}\ldots d_1 d_0 \rightarrow d_0 d_1 \ldots d_{q-2} d_{q-1} \quad (35)$$

In terms of 2-D texture, the coordinate transform for mapping f (s, t) to corresponding F(k) is $$(d_{q-2}\ldots d_1 d_0, d_{q-1}) \rightarrow d_0 d_1 \ldots d_{q-2} d_{q-1} \quad (36)$$

or $$s=k[2\ldots p-1]$$

$$t=k[1\ldots 0] \quad (37)$$

The coordinate transform described is demonstrated in FIG. 17.

While the texture subsystem is somewhat flexible in addressing the 2×2 input texel, the output is constrained to storing the output texels contiguously.

This portion of the disclosure describes how one can easily address the output texels from pass $P_i$ as inputs for pass $P_{j+1}$. It is presumed that the input vector is an even power of 4. The number of passes required for an N-element vector is $\log_4 N$. Given an element input vector, the addressing can be specified to be as such:

$$\begin{array}{cccccccccc} 0 & 1 & 2 & 3 & 4 & 5 & 6 & 7 & \ldots & \dfrac{N}{2}-1 \\ N & N+1 & N+2 & N+3 & N+4 & N+5 & N+6 & N+7 & \ldots & N-1 \end{array}$$

For the first pass, set the stride to be N/2 and specify the minification to be width/2. Minification is another pixel processing operation which provides for selective pixel addressing and processing in the texture subsystem of the present invention. A description of minification can be found in an application entitled "A Method for Accelerating Minified Texture Cache Access", filed on Mar. 26, 1998 and that description is hereby incorporated by reference. The input texels (and resulting texels) are then accessed as a sequence of 2×2 blocks. Thus, the first pass sequence would look like:

$$\begin{bmatrix} 0 & \frac{N}{4} \\ \frac{2N}{4} & \frac{3N}{4} \end{bmatrix} \begin{bmatrix} 1 & \frac{N}{4}+1 \\ \frac{2N}{4}+1 & \frac{3N}{4}+1 \end{bmatrix} \cdots \begin{bmatrix} \frac{N}{4}-1 & \frac{2N}{4}-1 \\ \frac{3N}{4}-1 & N-1 \end{bmatrix}$$

The resulting pixels are then stored in the following pattern:

$$\begin{bmatrix} 0 & \frac{N}{4} & 1 & \frac{N}{4}+1 & 2 & \frac{N}{4}+2 & \cdots & \frac{2N}{4}-1 \\ \frac{2N}{4} & \frac{3N}{4} & \frac{2N}{4}+1 & \frac{3N}{4}+1 & \frac{2N}{4}+2 & \frac{3N}{4}+2 & \cdots & N-1 \end{bmatrix}$$

If we continue this for subsequent passes, we note that for pass i, the four tuple at index j is:

$$\begin{bmatrix} j & \frac{N}{4^i}+j \\ \frac{2N}{4^i}+j & \frac{3N}{4^i}+j \end{bmatrix} \quad i=1,\ldots,\log_4 N$$

By close observation it is noted that for each pass i, the resulting pixels are stored in such a way that the resulting N-element vector can be cleanly split into i independent vectors and used as inputs for pass i+1. The split is done by taking contiguous sets of $N/2^{i-1}$ elements as one vector. Then, for each vector, set the width or stride to be $N/2^i$ and the minification to $N/2^{i+1}$.

This is earlier explained with real live data. So, let's consider a 64 element vector: 3 passes are required. For the first pass, arrange the original input as:

0 1 2 3 4 5 6 7 8 9 10 11 12 13 14 15 ( 16 17 18 19 20 21 22 23 24 25 26 27 28 29 30 31 )
32 33 34 35 36 37 38 39 40 41 42 43 44 45 46 47 48 49 50 51 52 53 54 55 56 57 58 59 60 61 62 63.

In this sequence, set the scanline stride or width=32 and minification=16. The resulting first pass will then look like:

0 16 1 17 2 18 3 19 4 20 5 21 6 22 7 23 8 24 9 25 10 26 11 27 12 28 13 29 14 30 15 31
32 48 33 49 34 50 35 51 36 52 37 53 38 54 39 55 40 56 41 57 42 58 43 59 44 60 45 61 45 61 46 62 47 63

For the second pass, now treat the first 32 elements as a scanline independent of the second 32. Now take the first 32 elements and set stride=16 and minification=8. The results of the second pass are then:

| 0 8 | 16 24 | 1 9 | 17 25 | 2 10 | 18 26 | 3 11 | 19 27 |
|-----|-------|-----|-------|------|-------|------|-------|
| 4 12 | 20 28 | 5 13 | 21 29 | 6 14 | 22 30 | 7 15 | 23 31 |

| 32 40 | 48 56 | 33 41 | 49 57 | 34 42 | 50 58 | 35 43 | 51 59 |
|-------|-------|-------|-------|-------|-------|-------|-------|
| 36 44 | 52 60 | 37 45 | 53 61 | 38 46 | 54 62 | 39 47 | 55 63 |

For the last pass, there are now 4 scanlines each with 16 elements. Set the stride=8 and minification=4 to yield:

| 0 1 | 8 9 | 16 17 | 24 25 | 4 5 | 12 13 | 20 21 | 28 29 |
|-----|-----|-------|-------|-----|-------|-------|-------|
| 2 3 | 10 11 | 18 19 | 26 27 | 6 7 | 14 15 | 22 23 | 30 31 |
| 32 33 | 40 41 | 48 49 | 56 57 | 36 37 | 44 45 | 52 53 | 60 61 |
| 34 35 | 42 43 | 50 51 | 58 59 | 38 39 | 46 47 | 54 55 | 62 62 |

Of course, the elements on the last pass are bit reversed so you will have to reorder them using an extra pass.

Special Cases: N is not a Power of 4

A special case may arise where N is a power of 2 but not a power of 4, i.e., $p=\log_2 N$ is an odd number, then we can represent n as $$n = d_{q-1} d_{q-2} \ldots d_1 b_0 \qquad (38)$$

where where $d_i = b_{2i} b_{2i-1}$, and $q = [p/2]$,

In this circumstance it is more appropriate to consider the decomposition of the FFTs into one radix-2 FFT followed by as needed number of radix-4 passes. An alternative to the minification scheme for restriding the data is the use of pixel textures. The pixel texture operation takes the input data as the actual address into the texture. Thus, one can define an array of data that maps the order in which we require the output data to be arranged. That mapping is then used as the input data through the pixel texture to reorder or restride the resulting data.

Beyond the ID FFT

Since the 2D Fourier Transform (FFT) is separable, it is most commonly computed indirectly by the successive application of the ID FFT, usually a radix 2 FFT, to the rows and columns of the 2D samples. It can also be computed using a direct 2D FFT with a vector radix, most commonly 2×2. The set of data required to compute a single output is in the form of 2 sets (real and imaginary) of 2×2 patterns in which the samples are separated by a certain stride. This addressing pattern is quite similar to that of mipmapping except that the stride between the samples is always 1 in mipmapping (i.e., they are always neighbors). With some simple modification to the addressing logic of texture addressing hardware of the present invention, it is possible to compute 2D FFT with vector radix 2×2. Since the mapping of the 2×2 butterfly in vector radix 2×2 FFT to the trilinear interpolation is straightforward, it greatly simplifies the control flow of the computation, and can impose less overhead even compared to the previously described row-column approach.

As described above, the ID FFT achieves its computational efficiency through a divide-and-conquer strategy. The FFT can be expressed as a combination of two half-length FFTs, each of which can be expressed in turn as a combination of two quarter-length FFTs, and so on. Similarly, a 2D FFT can be broken down into successively smaller 2D FFTs. This approach will be called "vector-radix FFT" whereas traditional ID FFT can be called "scalar-radix FFT". Assume that the 2D FFT of N×N samples of x is X, that is $$X(k_1, k_2) = \sum_{n_1=0}^{N-1}\sum_{n_2=0}^{N-1} x(n_1, n_2) W_N^{k_1 n_1 + k_2 n_2} \quad (39)$$

Using the decimation in frequency scheme, we can represent the vector radix 2×2 FFT as:

$$X(2K_1, 2K_2) = \sum_{n_1=0}^{\frac{N}{2}-1}\sum_{n_2=0}^{\frac{N}{2}-1} \left[ x(n_1, n_2) + x\left(n_1 + \frac{N}{2}, n_2\right) + x\left(n_1, n_2 + \frac{N}{2}\right) + x\left(n + \frac{N}{2}, n_2 + \frac{N}{2}\right) \right] W_{\frac{N}{2}}^{k_1 n_1 + k_2}$$

$$X(2K_1 + 1, 2K_2) = \sum_{n_1=0}^{\frac{N}{2}-1}\sum_{n_2=0}^{\frac{N}{2}-1} \left[ x(n_1, n_2) - x\left(n_1 + \frac{N}{2}, n_2\right) + x\left(n_1, n_2 + \frac{N}{2}\right) - x\left(n_1 + \frac{N}{2}, n_2 + \frac{N}{2}\right) \right] W_{\frac{N}{2}}^{k_1 n_1 + k_2, n_2}$$

$$X(2K_1, 2K_2 + 1) = \sum_{n_1=0}^{\frac{N}{2}-1}\sum_{n_2=0}^{\frac{N}{2}-1} \left[ x(n_1, n_2) + x\left(n_1 + \frac{N}{2}, n_2\right) - x\left(n_1, n_2 + \frac{N}{2}\right) - x\left(n_1 + \frac{N}{2}, n_2 + \frac{N}{2}\right) \right] W_N^{n} W_{\frac{N}{2}}^{k, n_1 + k_2, n_2}$$

$$X(2K_1 + 1, 2K_2 + 1) = \sum_{n_1=0}^{\frac{N}{2}-1}\sum_{n_2=0}^{\frac{N}{2}-1} \left[ x(n_1 n_2) - x\left(n_1 + \frac{N}{2}, n_2\right) + x\left(n_1, +n_2 + \frac{N}{2}\right) + x\left(n_1 + \frac{N}{2}, n_2 + \frac{N}{2}\right) \right] W_N^{n_1 + n_2} W_{\frac{N}{2}}^{k_1 n_1 + k_2 n_2}$$

$$\text{for } k_1, k_2 = 0, 1, \ldots \left(\frac{N}{2} - 1\right)$$

We employ the decimation in frequency algorithm in order to retain the original input order. However, in this scheme, the final outputs will be stored in bit reversed order. The algorithm can be simply described as:

Given an N×N image, we can employ log₂N iterations or passes of the vector radix 2×2 FFT. At each pass, we are effectively partitioning the result into the four computations

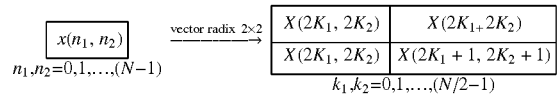

The twiddling factors at each pass are defined as:

$$\left.\begin{array}{l} \text{for } X(2K_1, 2K_2) \to 1 \\ X(2K_1 + 1, 2K_2) \to W_P^{n_1} \\ X(2K_1, 2K_2 + 1) \to W_P^{n_2} \\ X(2K_1 + 1, 2K_2 + 1) \to W_P^{n_1 + n_2} \end{array}\right\} \text{where } P = \frac{N}{\text{pass \#}}$$
$$\text{pass \#} = 1, 2, \ldots, (\log_2 N)$$

Since the decimation in frequency algorithm stores the final results in bit reverse order, another iteration or pass is required to reorder the data. The reordering is defined as follows:

$$X'(p, q) = X'(b_i, b_{i-1}, \ldots b_2\, b_1\, b_0, b_j\, b_{j-1}, \ldots, b_2\, b_1\, b_0)$$

where $b_i$, $b_j$=0 or 1 i,j=0, 1 . . . , log₂N
given $X(k_1, k_2)$ as the final result and $X'(p, q)$ as the computed result. Then the mapping is defined as:

$$X(k_1, k_2) = X'(b_0, b_1, b_2, \ldots, b_{i-1}, b_i, b_0\, b_1\, b_2, \ldots, b_{j-1}\, b_j)$$

where $(k_1, k_2)$ are represented in binary form as $k_1 = b_i\, b_{i-1}\, b_{1-2}, \ldots, b_2\, b_1\, b_0$ $k_2 = b_j\, b_{j-1}\, b_{j-2}, \ldots, b_2\, b_1\, b_0$ Conclusion The present invention provided an architecture in which normally complex transforms can be handled by a texture subsystem of a graphics processor. The texture subsystem architecture can include a plurality of arrays to perform "multiplex" and "adds" so as to undertake transforms such as, for example, a fast fourier transform (FFT).

What is claimed is:

1. A method for generating a fast fourier transform (FFT) comprising the steps of:
   receiving signal data;
   storing the received data in a memory;
   texturizing the data with parameters selected to generate the FFT transform; and
   storing the texturized data.

2. The method of claim 1, wherein said step of texturizing comprises the substeps of:
   reading the received data from the memory;
   passing the data to at least one array of linear interpolators; and
   performing multiply and accumulate operations on the data in said at least one array.

3. The method of claim 2 comprising the further step of transposing the data read prior to passing the data to the at least one array.

4. The method of claim 3 wherein said step of transposing comprises the step of adjusting data locality in accordance with an addressing scheme associated with said at least one array.

5. A method for generating a fast fourier transform (FFT), comprising the steps of:
   receiving signal data;
   storing the received data;

texturizing the data using parameters selected to perform multiply and accumulate operations that support generating the fast fourier transform using the received signal data as input data.

6. The method of claim 5, wherein said step of texturizing comprises the substeps of matching the input data to a predefined texturizing addressing scheme; and operating on input data with at least one array of linear interpolators.

7. The method of claim 6 comprising the further step of transposing the data read prior to passing the data to the at least one array of linear interpolators.

8. The method of claim 7 wherein said step of transposing comprises the step of adjusting data locality in accordance with an addressing scheme associated with said at least one array.

9. A method for generating an N point fast fourier transform, (FFT), where N is an integer divisible by 2, the method comprising the steps of:

a) receiving input data;

b) generating a first plurality of radix-4 FFT's using a texture subsystem;

c) storing the results of the step of generating;

d) generating a second plurality of radix-4 FFT's using the texture subsystem; and e) storing said results of the step of generating said second plurality of radix-4 FFTs.

10. The method of claim 9 wherein said first plurality of radix-4 FFTs correspond to a group of N/4 radix 4 FFTs.

11. The method of claim 10 wherein steps b) and d) constitute separate passes of an FFT process and the total number of passes, P equals $\log_4 N$.

12. The method of claim 9, wherein said step of generating a first plurality of radix-4 FFTs comprises the substeps of:

storing the received input data in a texture memory;

passing the received input data to at least one texture filter; and performing multiply and accumulate operations on the data in said at least one texture filter.

13. The method of claim 12 wherein said step of passing passes the received input data to four texture filters.

14. A system for generating a fast fourier transform (FFT) comprising:

a texture memory; and a texture filter coupled to said texture memory including at least one array of linear interpolators having parameters set to support calculations necessary to generate the fast fourier transform.

15. The system of claim 14 further comprising a data transposer coupled to said texture memory.

16. A system for generating a fast fourier transform from input data comprising:

a texture memory; and a plurality of texture filters, coupled to said texture memory, each texture filter including an array of linear interpolators that receive input data from said texture memory;

wherein each array of linear interpolators includes operation parameters set to perform calculations to support calculations necessary to generate the fast fourier transform.

17. The system of claim 16 further comprising a data transposer coupled to said, texture memory.

18. A method for generating fast fourier transforms, (FFT) the method comprising the steps of:

transposing data into an arrangement corresponding to a Level of Detail for a texturizing subsystem;

texturizing the transposed data using parameters, selected for generating a fast fourier transform; and storing the texturized data.

19. The method of claim 18 further comprising submitting the stored texturized data to a second stage of texturizing.

20. The method of claim 18 wherein for generating an N-point FFT where N is an integer divisible by $2^x$ where x is an integer greater than or equal to 1, after texturizing the transposed data to calculate a radix $2^4$ FFT where y is an integer greater than or equal to 1, submitting data to at least z additional passes of texturizing where $z=(\log_{2^y} N)-1$.

* * * * *